United States Patent
Morimitsu et al.

(10) Patent No.: US 10,680,217 B2
(45) Date of Patent: Jun. 9, 2020

(54) ASSEMBLED BATTERY, BATTERY MODULE, AND MANUFACTURING METHOD FOR ASSEMBLED BATTERY

(71) Applicant: TOYOTA JIDOSHA KABUSHIKI KAISHA, Toyota, Aichi-ken (JP)

(72) Inventors: Takatoshi Morimitsu, Toyota (JP); Yutaka Masugi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/002,139

(22) Filed: Jun. 7, 2018

(65) Prior Publication Data

US 2018/0366701 A1 Dec. 20, 2018

(30) Foreign Application Priority Data

Jun. 20, 2017 (JP) .................. 2017-120826

(51) Int. Cl.
| | |
|---|---|
| *H01M 2/02* | (2006.01) |
| *H01M 2/10* | (2006.01) |
| *H01M 10/04* | (2006.01) |
| *H01M 2/08* | (2006.01) |
| *B60L 50/64* | (2019.01) |

(Continued)

(52) U.S. Cl.
CPC .......... *H01M 2/1077* (2013.01); *B60L 50/50* (2019.02); *B60L 50/64* (2019.02); *H01M 2/08* (2013.01); *H01M 2/105* (2013.01); *H01M 10/0422* (2013.01); *H01M 10/0525* (2013.01); *H01M 2220/20* (2013.01)

(58) Field of Classification Search
CPC .......... H01M 2/1077; H01M 10/0422; H01M 2220/20; H01M 10/0525; H01M 2/08; H01M 2/105; H01M 2/20; H01M 10/0486; H01M 10/058; H01M 10/30; H01M 2/10; H01M 10/18; B60L 50/50; B60L 50/64

See application file for complete search history.

(56) References Cited

U.S. PATENT DOCUMENTS

| | | |
|---|---|---|
| 2016/0149175 A1 | 5/2016 | Morimitsu et al. |
| 2017/0244074 A1 | 8/2017 | Matsui |
| 2018/0138476 A1 | 5/2018 | Yamazaki et al. |

FOREIGN PATENT DOCUMENTS

| | | |
|---|---|---|
| EP | 3 026 732 A1 | 6/2016 |
| JP | 2015-191699 A | 11/2015 |

(Continued)

*Primary Examiner* — Cynthia K Walls
(74) *Attorney, Agent, or Firm* — Sughrue Mion, PLLC

(57) ABSTRACT

An assembled battery includes: a plurality of batteries; a holder having a holder part configured to hold outer circumferential surfaces of the batteries inserted in the battery through-holes; and a plurality of adhesive bodies that combine the batteries and inner circumferential surfaces of the holder part with each other. Each of the inner circumferential surfaces includes: a posture restricting portion configured to restrict a posture of each battery; a departing portion configured to depart from each battery around the whole circumference of the battery even when the battery takes any posture within the range; and a liquid-pouring groove connected from the second surface to the departing portion, and every adhesive body includes a whole-circumferential combined portion where the departing portion and the departing-portion opposing portion of each battery are combined with each other around the whole circumference.

10 Claims, 14 Drawing Sheets

(51) Int. Cl.
  *B60L 50/50* (2019.01)
  *H01M 10/0525* (2010.01)

(56) References Cited

FOREIGN PATENT DOCUMENTS

| | | |
|---|---|---|
| JP | 2016-66451 A | 4/2016 |
| JP | 2016-100255 A | 5/2016 |
| JP | 2016-207494 A | 12/2016 |
| JP | 2017/152157 A | 8/2017 |
| KR | 10-2016-0062701 A | 6/2016 |
| WO | 2015/145517 A1 | 10/2015 |

ASSEMBLED BATTERY, BATTERY MODULE, AND MANUFACTURING METHOD FOR ASSEMBLED BATTERY

INCORPORATION BY REFERENCE

The disclosure of Japanese Patent Application No. 2017-120826 filed on Jun. 20, 2017 including the specification, drawings and abstract is incorporated herein by reference in its entirety.

BACKGROUND

1. Technical Field

The present disclosure relates to an assembled battery including a plurality of cylindrical batteries, a battery module using this assembled battery, and a manufacturing method for an assembled battery.

2. Description of Related Art

Conventionally, there have been known assembled battery configured such that a plurality of cylindrical batteries are inserted and fixed into battery through-holes provided in plate-like holders (Japanese Patent Application Publication No. 2016-207494). In such assembled battery, the cylindrical batteries are fixed into the battery through-holes using a hardened adhesive agent.

SUMMARY

It is described that in the assembled battery disclosed in JP 2016-207494 A, in order to properly charge the adhesive agent in order to fix single batteries into holding holes of the holder, grooves are provided in the holding holes, and the adhesive agent is poured into the grooves. Unfortunately, depending on the postures of the batteries disposed in the holding holes, the adhesive agent is partially present between an inner circumferential surface of each holding hole and an outer circumferential surface of each battery, and thus a gap might be generated between the inner circumferential surface of the holding hole and the outer circumferential surface of each battery. In such a case, reliability of battery holding is diminished.

The present disclosure provides an assembled battery including a plurality of cylindrical batteries, the assembled battery being configured such that a part between each cylindrical battery and each battery through-hole of a holder part is charged with an adhesive agent around the whole circumference so as to fix the cylindrical battery thereto, and also provides a battery module using this assembled battery as well as a manufacturing method for the assembled battery.

One aspect of the present disclosure relates to an assembled battery including: a plurality of cylindrical batteries; a holder having a holder part, the holder part formed in a plate-like shape having a first surface and a second surface that is a back surface of the first surface, the holder part including a plurality of battery through-holes extending through the holder in a plate-thickness direction, the holder part configured to hold outer circumferential surfaces of the cylindrical batteries respectively inserted in the battery through-holes; and a plurality of adhesive bodies including an adhesive agent hardened between the outer circumferential surfaces of the cylindrical batteries and inner circumferential surfaces defining the battery through-holes of the holder part, the adhesive bodies combining the outer circumferential surfaces of the cylindrical batteries and the inner circumferential surfaces of the holder part with each other. The inner circumferential surfaces of the holder part defining the battery through-holes include: posture restricting portions that are configured to restrict ranges of postures that can be taken by the cylindrical batteries inserted in the battery through-holes; departing portions configured to depart from the outer circumferential surfaces of the cylindrical batteries around whole circumferences even when the cylindrical batteries take any postures within the ranges of the postures restricted by the posture restricting portions; and liquid-pouring grooves connected from the second surface to the departing portions, and the adhesive bodies include whole-circumferential combined portions formed by the hardened adhesive agent that combines the departing portions of the inner circumferential surfaces of the holder part with departing-portion opposing portions of the outer circumferential surfaces of the cylindrical batteries, the departing-portion opposing portions opposing the departing portions, around the whole circumferences of the cylindrical batteries.

In this assembled battery, the inner circumferential surface defining each battery through-hole of the holder part includes not only the posture restricting portion restricting the range of the posture that can be taken by each cylindrical battery, but also the departing portion formed in such a manner as to depart from the outer circumferential surface of each cylindrical battery around the whole circumference. In addition, the adhesive body, which combines the outer circumferential surface of each cylindrical battery and each inner circumferential surface of the holder part defining each battery through-hole with each other, includes a whole-circumferential combined portion where the departing portion and the departing-portion opposing portion are combined with each other around the whole circumference of each cylindrical battery by the hardened adhesive agent. Hence, in this assembled battery, it is possible to securely fix and hold each cylindrical battery into each battery through-hole of the holder part around the whole circumference of the cylindrical battery. In addition, in this assembled battery, it is possible to readily supply the unhardened adhesive agent to the departing portion via the liquid-pouring groove. By providing the liquid-pouring groove, it is possible to temporarily retain the adhesive agent having been poured into the liquid-pouring groove by a volume between the outer circumferential surfaces of each cylindrical battery and the liquid-pouring groove, and thereafter, it is possible to allow the adhesive agent to spread in the circumferential direction of the departing portion at a spreading speed depending on the viscosity of the adhesive agent. Accordingly, it is possible to reduce the frequencies and the time of pouring the adhesive agent, to thereby reduce the manufacturing cost for the assembled battery.

In this assembled battery, the orientations of the cylindrical batteries can appropriately be defined. For example, all the batteries may be inserted into the holder part in the same orientation (an orientation in which positive electrodes of all the batteries are located on the first surface side, or the negative electrodes thereof are located on the first surface side), or the respective batteries may be inserted into the holder part with orientations of the batteries being alternately arranged so as to be inverse to one another. In addition, a center portion in the axial direction of each cylindrical battery may be held by each battery through-hole of the holder part, or one end in the axial direction of each cylindrical battery or the other end in the axial direction of each cylindrical battery may be held by each battery through-hole of the holder part.

The holder part of the holder is a plate-like member having the first surface and the second surface, and is bored with the battery through-holes in the plate-thickness direction so as to hold the outer circumferential surfaces of the cylindrical batteries inserted into the battery through-holes. Although the battery through-holes may be appropriately arranged, it is preferable to arrange the battery through-holes such that if an axis of a battery through-hole of interest is defined as its center, respective axes of other peripheral battery through-holes are located at apexes of a hexagon surrounding this center. This is for the purpose of a compact arrangement of the battery through-holes.

The posture restricting portion of the inner circumferential surface of each battery through-hole is a portion that restricts the range of the posture that can be taken by each cylindrical battery, and for example, one or more portions having a smaller diameter than that of the departing portion corresponds to the posture restricting portion. The departing portion is a portion formed in such a manner as to depart from the outer circumferential surface of each cylindrical battery around the whole circumference even when the cylindrical battery takes any posture within the range of the posture restricted by the posture restricting portion. An example manner of each battery through-hole having the posture restricting portion and the departing portion may include such a battery through-hole having a two-stepped cylindrical inner circumferential surface including the posture restricting portion having a smaller diameter (having a relatively small gap relative to the outer circumferential surface of each inserted cylindrical battery) on the first surface side, and the departing portion whose diameter is greater than that of the posture restricting portion located on the second surface side. The battery through-hole may have a two-stepped tapered inner circumferential surface configured such that a tapered posture restricting portion whose diameter is smaller and gradually greater toward the second surface side is provided on the first surface side, and a tapered departing portion whose diameter is greater than that of the posture restricting portion and gradually greater toward the second surface side is provided on the second surface side. The battery through-hole may have an inner circumferential surface in a three-stepped cylindrical shape whose middle step is greater, the inner circumferential surface being configured such that posture restricting portions having smaller diameters are provided on the first surface side and the second surface side in the plate-thickness direction, and a portion between these two posture restricting portions is defined to be a departing portion having a greater diameter than those of these posture restricting portions. The battery through-hole may also be configured such that respective ends thereof on the first surface side and on the second surface side are defined to be posture restricting portions having smaller diameters, and a portion of the battery through-hole whose diameter is gradually greater toward the center thereof in the plate-thickness direction is defined to be a departing portion. In addition, the battery through-hole may be formed in a female-screw shape whose ridges are defined as posture restricting portions and whose troughs are defined as departing portion, and they are arranged in a double helix form.

The liquid-pouring groove may be a portion composed by a circumference part of the battery through-hole that is recessed in the radially outward direction, and the portion connects the second surface and the departing portion to each other, and only one or more than one liquid-pouring grooves may be formed in each battery through-hole. By providing one liquid-pouring groove, the advancing direction of the spreading (flowing around) of the adhesive agent between the departing portion and the departing-portion opposing portion of each cylindrical battery can be restricted to two directions, and thus it is possible to promote such a possibility that pieces of the adhesive agent advancing in the inverse directions meet and become integrated with each other.

As the adhesive agent used for the adhesive body, an adhesive agent made from epoxy resin, polyimide resin, silicone resin, acrylic resin, or the like may be selected. As a viscosity of the unhardened adhesive agent in the pouring step, there may be selected a viscosity at which the poured adhesive agent does not flow out from the gap between each inner circumferential surface of the holder part and the outer circumferential surface of each cylindrical battery, and may be selected from a range of 1 to 500 mPa·s.

In the above assembled battery, the assembled battery may be configured such that the adhesive bodies provide air-tight sealing between the battery through-holes and the cylindrical batteries inserted in the battery through-holes in the plate-thickness direction.

In this assembled battery, it is possible to prevent a flow of gas or the like flowing through the gap between each battery through-hole of the holder part and each cylindrical battery. Hence, it is possible not only to compose the assembled battery by the respective cylindrical batteries, but also to allow the holder and the respective cylindrical batteries to function as partitioning walls that secure air-tightness in the plate-thickness direction in the holder part.

The assembled battery as set forth in any one of the above descriptions, the posture restricting portions may include first posture restricting portions located closer to the first surface than the departing portions in the plate-thickness direction. Diameters of the first posture restricting portions may be smaller than diameters of the departing portions.

In this assembled battery, the first posture restricting portion having a smaller diameter than that of the departing portion is provided at a position closer to the first surface side than the departing portion. Hence, it is possible to restrict the range of the posture taken by each cylindrical battery by the first posture restricting portion having a smaller diameter, and also to suppress the unhardened adhesive agent poured between the departing portion and the departing-portion opposing portion from dropping down toward the first surface side; therefore, it is possible to manufacture the assembled battery having the adhesive body including the whole-circumferential combined portion that is more securely formed between the departing portion and the departing-portion opposing portion.

Further, in the above assembled battery, the posture restricting portions may include second posture restricting portions located closer to the second surface than the departing portions in the plate-thickness direction. Diameters of the second posture restricting portions may be smaller than diameters of the departing portions.

In this assembled battery, in the plate-thickness direction, not only the first posture restricting portion is provided on the first surface side, but also the second posture restricting portion is provided on the second surface side. That is, since the posture restricting portions are provided at two positions apart from each other in the plate-thickness direction with the departing portion interposed therebetween, it is possible to further readily and securely restrict the range of the posture taken by each cylindrical battery.

As described above, as an example of the manner of the holder part provided with the first posture restricting portion and the second posture restricting portion, for example, there may be employed a battery through-hole having an inner circumference surface in three-stepped cylindrical shape whose middle step is greater, where a portion between the first posture restricting portion and the second posture restricting portion is defined to be a departing portion whose diameter is greater than those of the posture restricting portions. Each battery through-hole may be configured such that the respective ends on the first surface side and on the second surface side of the battery through-hole are defined to be posture restricting portions having smaller diameters, and the diameter of the battery through-hole is set to be gradually greater toward the center in the plate-thickness direction, and this portion is defined to be the departing portion. In addition, the battery through-hole may be formed in a female-screw shape in such a manner that the posture restricting portions and the departing portions are arranged in a double helix form.

Furthermore, a second aspect of the present disclosure relates to a battery module including any one of the above-described assembled battery; and a first-surface shielding member (a first-surface shielding container) configured to cover the holder part of the holder and the cylindrical batteries of this assembled battery from the first surface side so as to be air-tightly combined with the holder.

This battery module includes the above-described assembled battery holding the cylindrical batteries in the holder part of the holder; and the first-surface shielding member. The first-surface shielding member covers the cylindrical batteries held by the holder part from the first surface side so as to be air-tightly combined with the holder. The assembled battery is an assembled battery composed of the respective batteries, and also functions as an air-tight partitioning wall. Hence, in the battery module of the present disclosure, it is possible to prevent gas or the like from flowing (e.g. cooling air from leaking) through a portion between the first-surface shielding member side and the opposite side thereto of the assembled battery and a combined portion between the holder and the first-surface shielding member.

An example of this battery module may include such a battery module that for example, air is sent into the first-surface shielding member from a fan attached to the first-surface shielding member or to another member, or air inside the member is exhausted by a ventilator so as to cool the respective batteries. In this battery module, it is possible to prevent that the cooling air leaks through a portion between the first-surface shielding member side of the assembled battery and the opposite side thereto, and a combined portion between the holder and each first-surface shielding member, and this air leakage disturbs a flow of the cooling air flowed into or exhausted by the fan or the ventilator, resulting in defects such as non-uniformity in the cooling condition among the respective batteries.

A third aspect of the present disclosure relates to a manufacturing method for an assembled battery, the method including: inserting a plurality of cylindrical batteries into a plurality of battery through-holes of a holder part; the holder part being in a plate-like shape and including a first surface and a second surface that is a back surface of the first surface, the battery through-holes extending through the holder part in a plate-thickness direction of the holder part, a plurality of inner circumferential surfaces of the holder part, defining the battery through-holes, the inner circumferential surfaces including: posture restricting portions each of which is configured to restrict a range of a posture taken by each of the cylindrical batteries inserted in the battery through-holes; departing portions departing from outer circumferential surfaces of the cylindrical batteries around whole circumferences even when the cylindrical batteries take any postures within the ranges of the postures restricted by the posture restricting portions; and liquid-pouring grooves connected from the second surface to the departing portions;

in a state in which the holder part in which the cylindrical batteries are inserted is put into a posture where the second surface of the holder part faces upward, pouring an unhardened adhesive agent via the liquid-pouring grooves of the inner circumferential surfaces of the holder part between the departing portions and departing-portion opposing portions of the outer circumferential surfaces of the cylindrical batteries, the departing-portion opposing portions opposing the departing portions, and allowing the unhardened adhesive agent to spread between the departing portions and the departing-portion opposing portion of the cylindrical batteries around the whole circumferences of the cylindrical batteries so as to combine the departing portions and the departing-portion opposing portions with each other around the whole circumferences of the cylindrical batteries with the unhardened adhesive agent; and hardening the unhardened adhesive agent so as to form the adhesive bodies between the inner circumferential surfaces of the holder part and the outer circumferential surfaces of the cylindrical batteries.

In this manufacturing method for the assembled battery, after the cylindrical batteries are inserted into the holder part, the unhardened adhesive agent is poured and allowed to spread between the departing portion of the holder part and the departing-portion opposing portion of each cylindrical battery so as to combine the departing portion and the departing-portion opposing portion with each other around the whole circumference of the cylindrical battery with the unhardened adhesive agent. Thereafter, the unhardened adhesive agent is hardened. Through this, the adhesive bodies include the whole-circumferential combined portions where the hardened adhesive agent is combined between the departing portions of the holder part and the departing-portion opposing portions of the cylindrical batteries. Hence, in this assembled battery, it is possible to securely fix and hold the cylindrical batteries into the respective battery through-holes of the holder part around the whole circumferences. Furthermore, the unhardened adhesive agent is poured through the liquid-pouring grooves between the departing portions and the departing-portion opposing portions. By carrying out this, it is possible to pour the unhardened adhesive agent between the departing portions and the departing-portion opposing portions.

As the method of hardening the unhardened adhesive agent, an appropriate method depending on the adopted adhesive agent may be employed. For example, if a thermosetting adhesive agent such as an epoxy resin is adopted, the agent may be retained for a predetermined time period at a proper temperature for the hardening of the adhesive agent.

In the above manufacturing method for the assembled battery, the manufacturing method for the assembled battery may be configured such that the adhesive bodies provide air-tight sealing between the battery through-holes and the cylindrical batteries inserted in the battery through-holes in the plate-thickness direction.

In this manufacturing method for the assembled battery, it is possible to manufacture the assembled battery preventing flows of gas or the like through the gaps between the battery through-holes of the holder part and the cylindrical batteries. Hence, it is possible to compose the assembled battery by the respective cylindrical batteries, and also to allow the holder and the respective cylindrical batteries to function as the partitioning walls that secure air-tightness in the plate-thickness direction in the holder part.

In any one of the manufacturing methods for an assembled battery described above, each of the inner circumferential surfaces may be provided with a single liquid-pouring groove that is one of the liquid-pouring grooves, and the pouring of the unhardened adhesive agent in accordance with a predetermined procedure may be repetitively carried out several times, between the outer circumferential surfaces of the cylindrical batteries and the inner circumferential surfaces of the holder part.

At the time of pouring the adhesive agent between each departing portion and each departing-portion opposing portion via the liquid-pouring groove, in the case in which a volume of the gap between the departing portion and the departing-portion opposing portion is greater compared with the volume of the liquid-pouring groove, if required amount of the adhesive agent to be poured is greater compared with the volume of the liquid-pouring groove, and if this amount of the adhesive agent is poured in a short time, the adhesive agent might flow over from the liquid-pouring groove, so that the required amount of the adhesive agent cannot be poured at a time in a short time.

On the other hand, in this manufacturing method for the assembled battery, the pouring of the adhesive agent is repetitively carried out in accordance with the predetermined procedure. Through this, it is possible to pour the required amount of the adhesive agent for every battery, and thus the adhesive agent can be allowed to more securely spread around the whole circumference so as to combine the departing portion and the departing-portion opposing portion with each other around the whole circumference of every cylindrical battery with the unhardened adhesive agent.

Furthermore, in any one of the manufacturing methods for an assembled battery described above, each posture restricting portion may include a first posture restricting portion located closer to the first surface than each departing portion in the plate-thickness direction. The first posture restricting portion may have a smaller diameter than a diameter of the departing portion. In a state in which the postures of the cylindrical batteries inserted in the inner circumferential surfaces are put in postures within ranges restricted by the first posture restricting portions, the unhardened adhesive agent may be poured between the departing portions and the departing-portion opposing portions of the outer circumferential surfaces of the cylindrical batteries, the departing-portion opposing portions opposing the departing portions, and the unhardened adhesive agent may be hardened so as to form the adhesive bodies therebetween.

In this manufacturing method for the assembled battery, the inner circumferential surface of each battery through-hole is provided with the first posture restricting portion at the position closer to the first surface than the departing portion, and the unhardened adhesive agent is poured such that the range of the posture taken by each of the cylindrical batteries is set to be a posture within a range restricted by the each posture restricting portion. Hence, it is possible to properly restrict the posture taken by each cylindrical battery by the first posture restricting portion having a smaller diameter, and also to suppress the unhardened adhesive agent poured between the departing portion and the departing-portion opposing portion from dropping down toward the first surface side; therefore, it is possible to manufacture the assembled battery having the adhesive bodies including the whole-circumferential combined portions that are more securely formed between the departing portions and the departing-portion opposing portions.

Furthermore, in the above manufacturing method of the assembled battery, the inner circumferential surfaces may include second posture restricting portions located closer to the second surface than the departing portions in the plate-thickness direction. Diameters of the second posture restricting portions may be smaller than diameters of the departing portions.

In this manufacturing method for the assembled battery, the inner circumferential surface of each battery through-hole is provided with not only the first posture restricting portion but also the second posture restricting portion. Accordingly, at the time of pouring and hardening the adhesive agent, it is possible to more properly restrict the range of the posture taken by each cylindrical battery, and also to pour and harden the adhesive agent between the departing portion and the departing-portion opposing portion.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
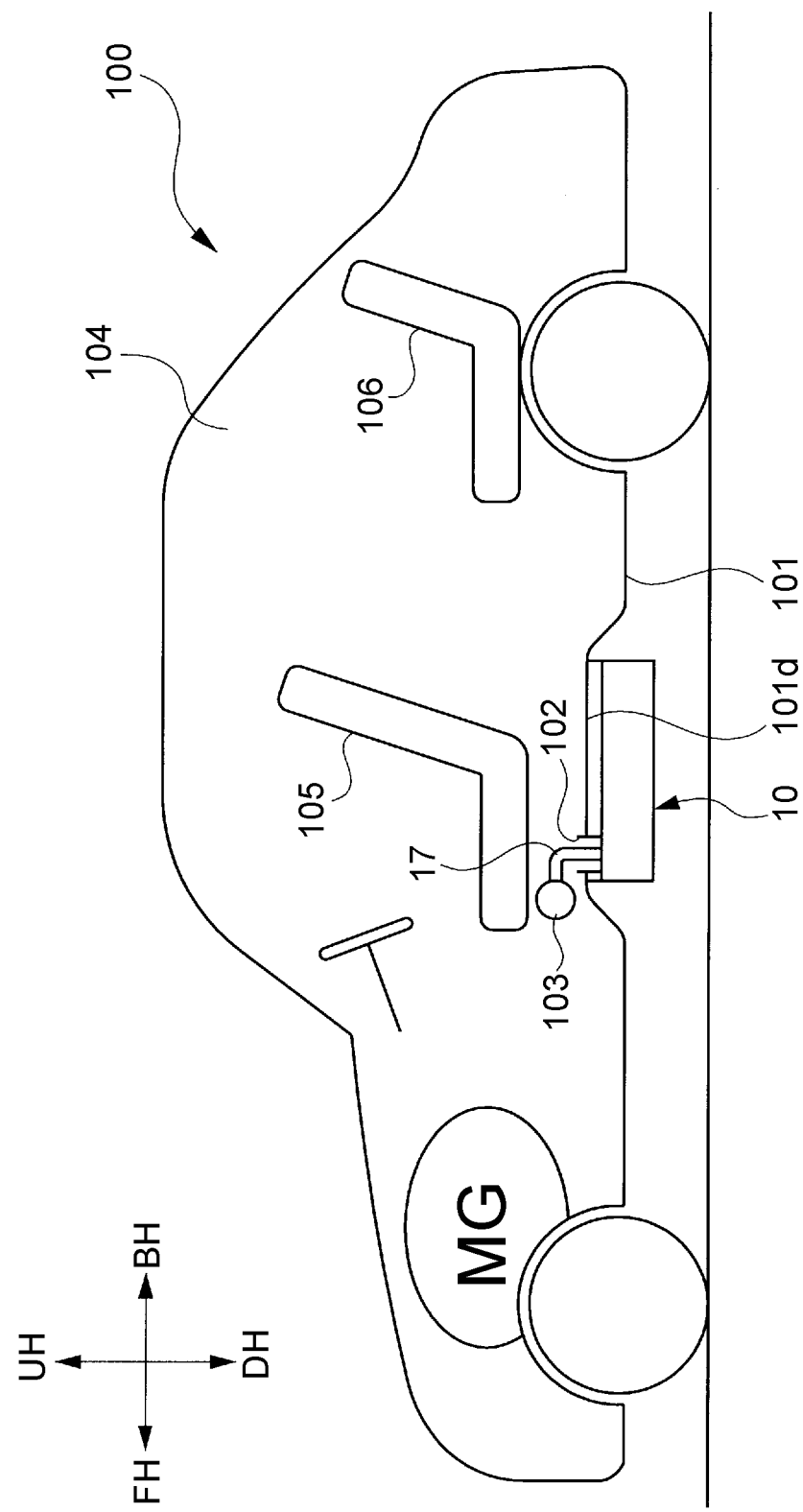
FIG. 1 is an explanatory view showing a state in which a battery pack including a battery module according to an embodiment is mounted in an electrically drive vehicle.
Figure 2:
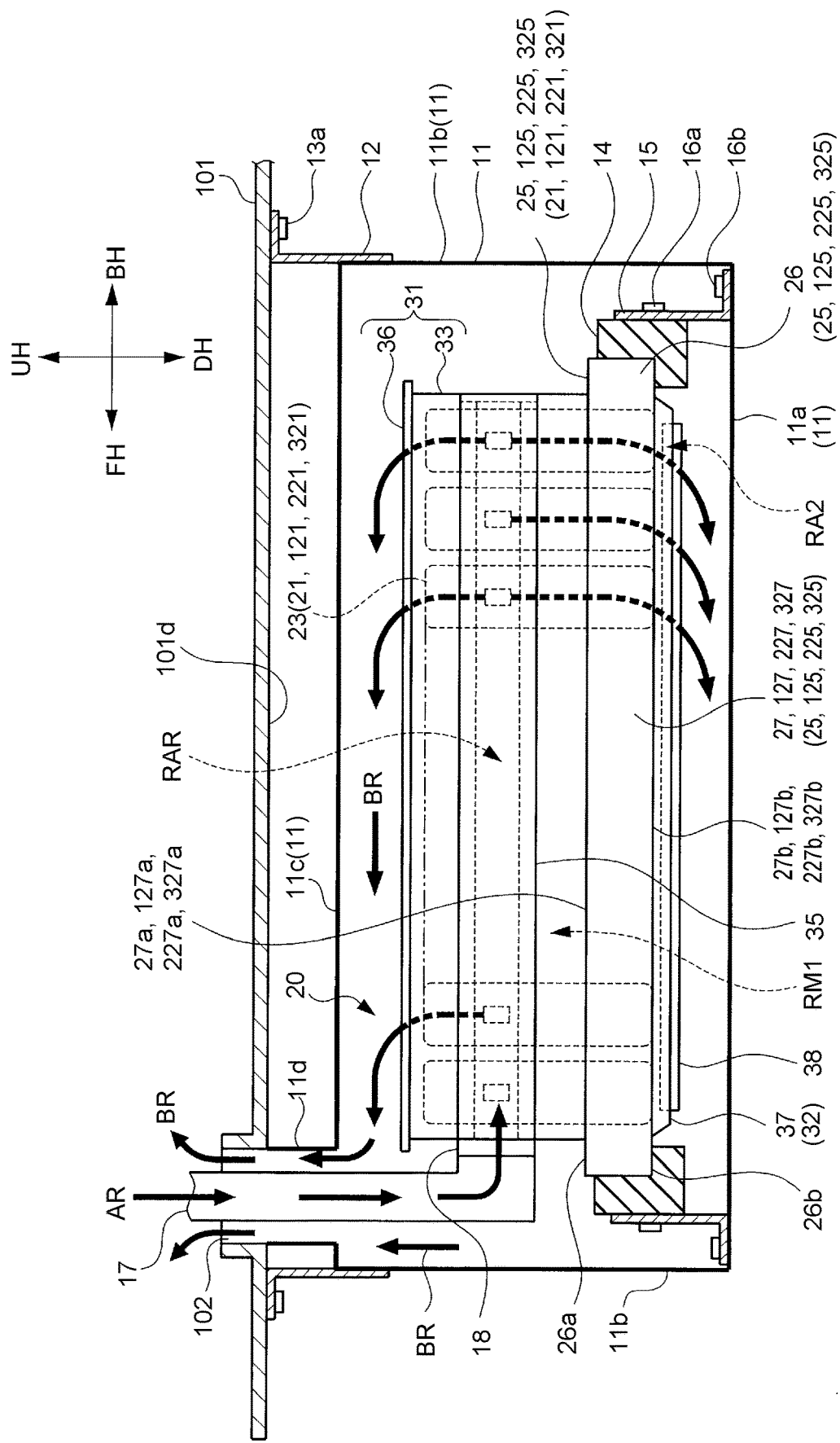
FIG. 2 is a longitudinal sectional view of the battery pack including the battery module according to the embodiment.

An assembled battery 21 and a battery module 20 according to an embodiment of the present disclosure will be described with reference to the drawings. In the present embodiment, a battery pack 10 in which the battery module 20 is incorporated is attached from a vertically lower side DH to a floor panel 101 of an electrically drive vehicle 100 driven by a motor generator MG, at a position below a front seat 105, as shown in FIG. 1. Specifically, as shown in FIG. 2, a pack case 11 is fixed, via brackets 12 attached to a side plate 11b of the pack case 11, to a lower surface 101d of the floor panel 101 of the electrically drive vehicle 100 with bolts 13a in such a manner as to be hung from the floor panel 101. This pack case 11 is supplied with cooling air AR that cools batteries 23 accommodated in the battery pack 10 from a cooling fan 103 attached inside a vehicle cabin 104. In each drawing of FIG. 1 and FIG. 2, an upward direction indicates an upper side UH in the vertical direction (vertically upper side UH), a downward direction indicates a lower side DH in the vertical direction (vertically lower side DH), a leftward direction indicates a front side FH of the electrically drive vehicle 100, and a rightward direction indicates a back side BH of the electrically drive vehicle 100.

Figure 3:
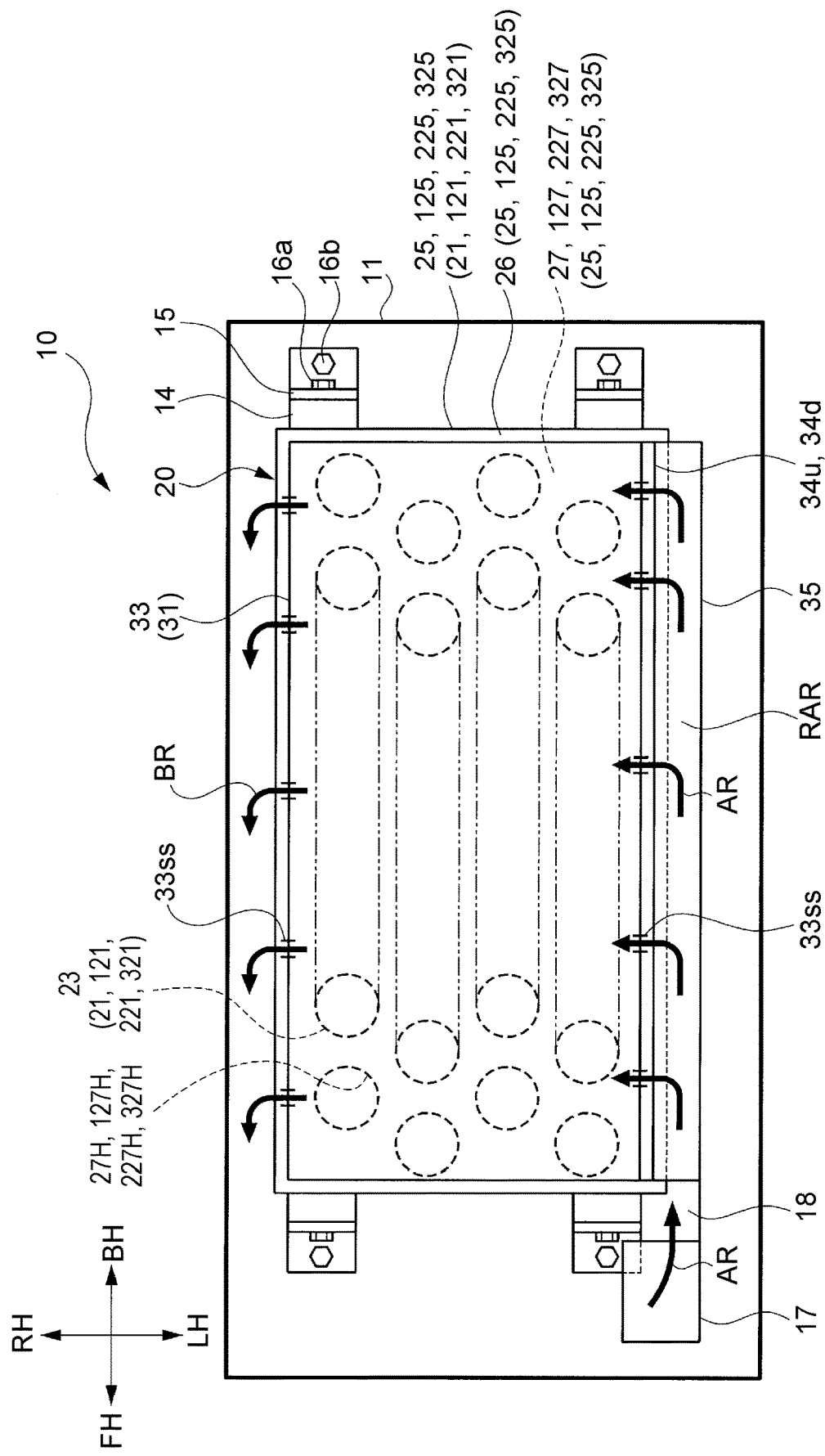
FIG. 3 is a plan sectional view of the battery pack including the battery module according to the embodiment.
Figure 4:
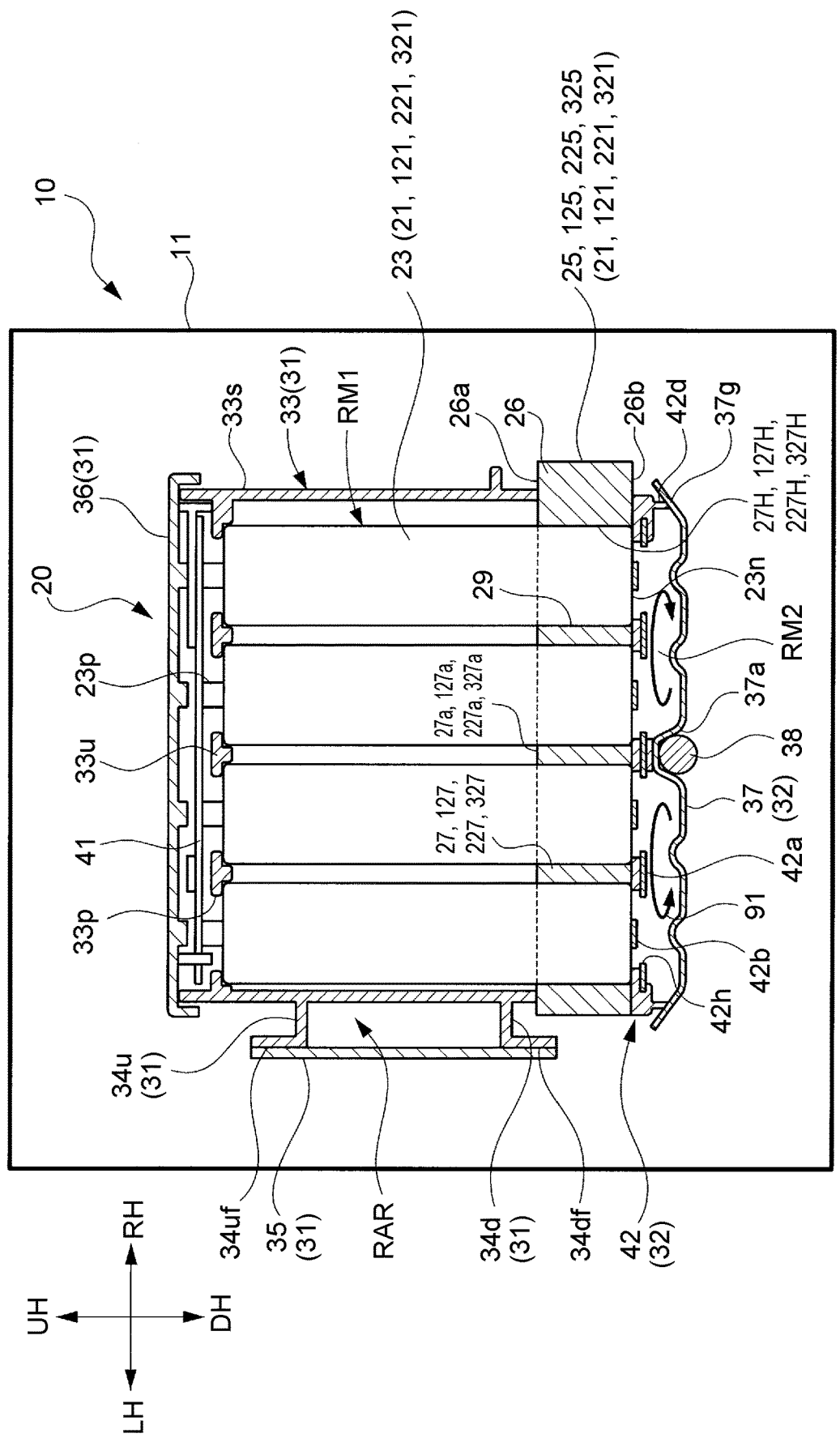
FIG. 4 is a cross sectional view of the battery pack including the battery module according to the embodiment.

As shown in FIG. 2 to FIG. 4, the battery pack 10 of the present embodiment accommodates the battery module 20 in the pack case 11. The battery module 20 includes thereinside the assembled battery 21 composed by the (sixty in the present embodiment) cylindrical batteries 23 and a holder member 25 holding these batteries 23 (see FIG. 5 and FIG. 6). In addition to this, the battery module 20 includes a first-surface shielding member 31 and a second-surface shielding member 32; and the first-surface shielding member 31 and the second-surface shielding member 32 are combined with the holder member 25 of the assembled battery 21 so as to cover all the batteries 23 from the vertically upper side UH and from the vertically lower side DH, respectively.

The batteries 23 of the assembled battery 21 are secondary batteries such as nickel-hydrogen batteries or lithium ion batteries housed in a cylindrical case. One ends of the batteries 23 are positive electrode terminals 23p whose centers project, and the other ends thereof are flat negative electrode terminals 23n (see FIG. 5).

The holder member 25 holding the respective batteries 23 includes: a plate-like holder part 27 holding the batteries 23; and a seal part 26 that is located around the holder part 27 so as to be air-tightly combined with the first-surface shielding member 31 and the second-surface shielding member 32. In the above configuration, the plate-like holder part 27 is formed with battery through-holes 27H by the number (sixty in the present embodiment) of the batteries 23 to hold, the battery through-holes 27H extending through in a plate-thickness direction TH between a first surface 27a and a second surface 27b that is a back surface of the first surface 27a. The battery through-holes 27H are arranged in four rows each of which includes fifteen holes, in a staggered manner, and the battery through-holes 27H are arranged such that defining an axis 27Hx of a battery through-hole 27H of interest as its center, respective axes 27Hx of other peripheral battery through-holes 27H around this battery through-hole 27H of interest are located at respective apexes of a hexagon surrounding this center (see FIG. 3).

In the assembled battery 21, the batteries 23 are inserted into the respective battery through-holes 27H of the holder part 27 of the holder member 25 in such a posture that the positive electrode terminals 23p thereof are located on the first surface 27a side, and the negative electrode terminals 23n thereof are located on the second surface 27b side. The batteries 23 are arranged such that negative electrode ends 23A on the negative electrode terminal 23n side of the batteries 23 are located in the battery through-holes 27H, and the second surface 27b of the holder part 27 and the negative electrode terminals 23n of the batteries 23 are flush with each other. Thereafter, gaps SM between an inner circumferential surfaces 27S of the battery through-holes 27H and outer circumferential surfaces 23S of the batteries 23 are charged with an adhesive agent AD, and the adhesive agent AD is hardened into adhesive bodies 29, and the batteries 23 are fixed to the respective battery through-holes 27H through the adhesive bodies 29 (see FIG. 7).

As will be described later, in the assembled battery 21 of the present embodiment, every adhesive body 29 that fixes each battery 23 provides air-tight sealing between each battery through-hole 27H and each battery 23 inserted into this battery through-hole 27H in the plate-thickness direction TH. Accordingly, a flow of air or the like is prevented from being generated between the first surface 27a side (the vertically upper side UH) and the second surface 27b side (the vertically lower side DH) of the holder part 27, via gaps SM between the battery through-holes 27H and the outer circumferential surfaces 23S of the batteries 23.

The holder member 25 is composed by a metallic material, such as aluminum having a high thermal conductivity. Hence, in the assembled battery 21 in which the batteries 23 are assembled into the battery through-holes 27H of the holder member 25 (the holder part 27), increased heat of the batteries 23 can be given off from the outer circumferential surfaces 23S thereof to the holder member 25 so as to decrease the temperature of the batteries 23. Inversely, heat of the holder member 25 can be transferred to the batteries 23 so as to increase the temperatures of the batteries 23. Since the heat of the respective batteries 23 is mutually transferred via the holder member 25, it is possible to suppress variation in temperature among the batteries 23. Note that a thickness of the holder part 27 of the holder member 25 is set to be thick enough to hold the batteries 23 by the battery through-holes 27H, and also to effectively carry out heat transfer through thermal conduction, for example, approximately ¼ of a length of each battery 23.

As shown in FIG. 2, L-shaped electric insulators 14 composed by an electric insulating resin are attached to both ends on the front side FH and the back side BH of the holder member 25. One surface of L-shaped brackets 15 are fixed to the electric insulators 14 with bolts 16a, and the other surfaces of the brackets 15 are fixed to an inner surface of a bottom plate 11a of the pack case 11 with bolts 16b. The battery module 20, in which the assembled battery 21 holds the batteries 23 by the holder member 25, and the assembled battery 21 is covered by the first-surface shielding member 31 and the second-surface shielding member 32, is fixed to the pack case 11.

Next, the first-surface shielding member 31 that covers this assembled battery 21 from the first surface 27a side (vertically upper side UH) of the holder part 27 of the holder member 25 will be described (see FIG. 2 to FIG. 6). The first-surface shielding member 31 includes a battery cover 33 made of an insulating resin, and a cover member 36 attached on the vertically upper side UH of the battery cover 33.

Figure 5:
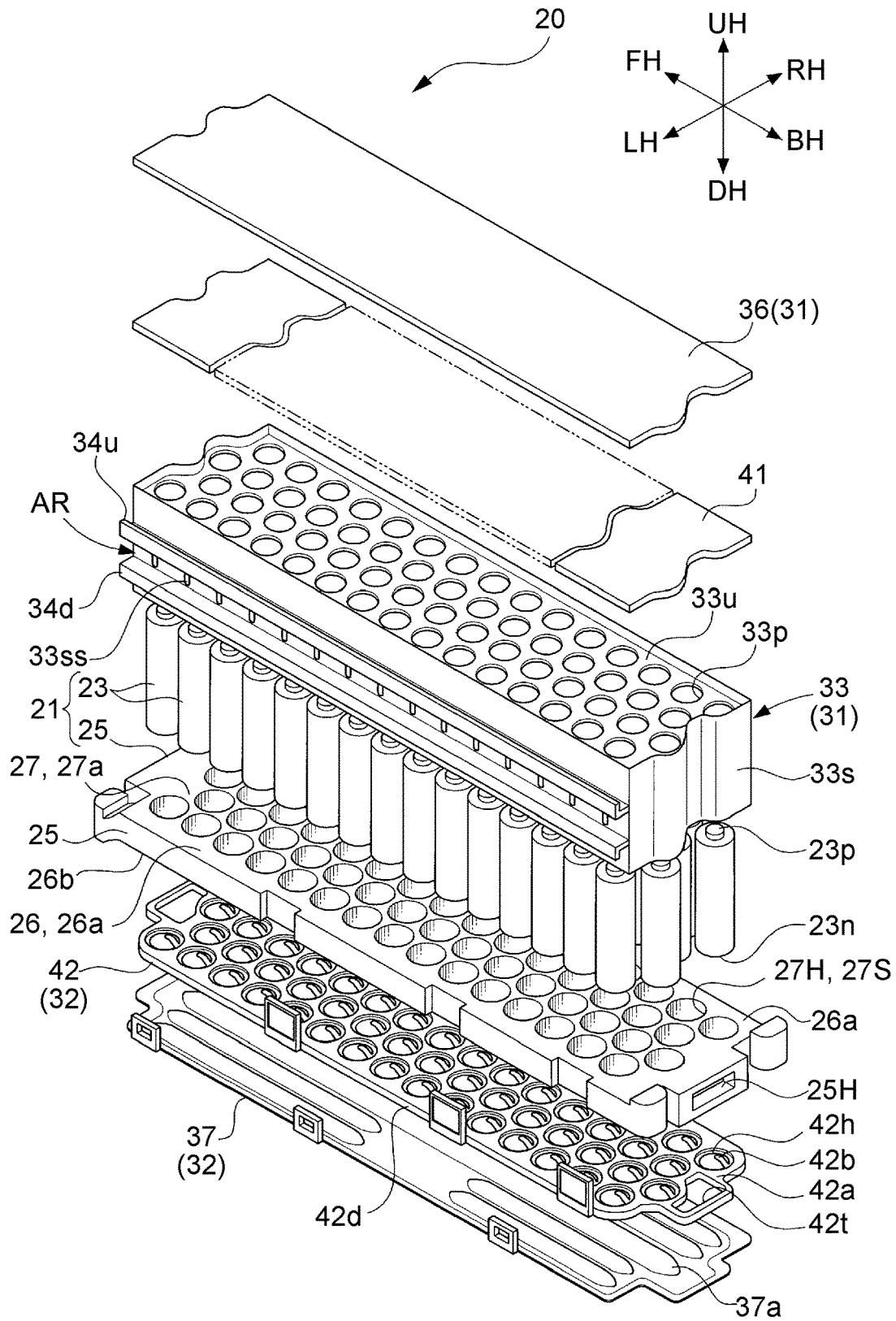
FIG. 5 is an exploded perspective view of the battery module including an assembled battery according to the embodiment.

The battery cover 33 is composed by: an upper cover part 33u in which positive electrode insertion holes 33p through which the positive electrode terminals 23p of the batteries 23 pass are arranged in correspondence with the arrangement of the batteries 23; and a side cover part 33s in a square cylindrical shape covering the outer circumferences of the batteries 23 assembled to the holder member 25. As shown in FIG. 4, the side cover part 33s of the battery cover 33 is in air-tight contact with a first seal surface 26a of the seal part 26 provided around a periphery of the holder part 27 of the holder member 25. The respective positive electrode terminals 23p of the batteries 23 project from the respective positive electrode insertion holes 33p of the upper cover part 33u of the battery cover 33. As shown in FIG. 4 and FIG. 5, on the vertically upper side UH of the upper cover part 33u of the battery cover 33, a plurality of plate-like positive electrode bus bar members 41 are placed such that each positive electrode bus bar member 41 is in contact with positive electrode terminals 23p in every predetermined number (twelve in the present embodiment) of the batteries 23 so as to allow these positive electrode terminals 23p to be electrically connected to each other; and in addition, the positive electrode bus bar members 41 are covered from the vertically upper side UH by the cover member 36 made of an insulating resin.

As shown in FIG. 2 to FIG. 5, of the side cover part 33s of the battery cover 33, a side surface on the left side LH (on the left in FIG. 4) is formed with an upper flange 34u and a lower flange 34d, each in an L shape protruding outward. A flange surface 34uf of the upper flange 34u extends in the vertically upper side UH, and a flange surface 34df of the lower flange 34d extends in the vertically lower side DH. As shown in FIG. 4, a long side plate 35 extending long in the longitudinal direction (a vertical direction in the drawing of FIG. 4) is fixed to the flange surfaces 34uf, 34df of the both flanges 34u, 34d, and these flanges 34u, 34d and the side plate 35 define an air flow passage RAR extending long in the longitudinal direction. In addition, as shown in FIG. 2, FIG. 3, FIG. 5, of the side cover part 33s of the battery cover 33, a part located between the both flanges 34u, 34d and facing the air flow passage RAR is formed with a plurality of slits 33ss for introducing the cooling air AR flowing through the air flow passage RAR into the battery cover 33 so as to cool portions of the batteries 23, the portions located on the first surface 27a side (the vertically upper side UH) than the holder part 27.

Each of FIG. 2 and FIG. 5 shows that of the side cover part 33s of the battery cover 33, the surface on the left side LH is formed with the slits 33ss. Note that, as shown in FIG. 3, of the side cover part 33s of the battery cover 33, a surface on the right side RH is also formed with the same slits 33ss as the surface on the left side LH. The slits 33ss formed on the right side RH of the battery cover 33 are used for discharging returning air BR after cooling the batteries 23 from the battery cover 33 into the pack case 11 of the battery pack 10.

In this manner, the vertically upper side UH (on the first surface 27a side) of the assembled battery 21 composed by the holder member 25 and the batteries 23 held thereby is covered by the first-surface shielding member 31 composed by the battery cover 33, the cover member 36, and others; therefore, the holder member 25, the battery cover 33, and the cover member 36 accommodate the batteries 23 thereinside, and compose a first chamber RM1 that is a space into which the cooling air AR for cooling the batteries 23 is introduced.

Next, there will be described the second-surface shielding member 32 that covers the assembled battery 21 from the second surface 27b side (on the vertically lower side DH) of the holder part 27. This second-surface shielding member 32 includes: a negative electrode bus bar assembly 42 disposed on the second surface 27b side (on the vertically lower side DH) of the holder member 25 so as to be electrically connected to the negative electrode terminals 23n of the batteries 23; and a tray-like-shaped bottom plate 37 that covers the holder member 25 and the negative electrode bus bar assembly 42 from the vertically lower side DH.

Specifically, as shown in FIG. 4 and FIG. 5, the plate-like negative electrode bus bar assembly 42 is fixed to a second seal surface 26b of the seal part 26 of the holder 25, the second seal surface 26b facing the vertically lower side DH, in such a manner that the negative electrode bus bar assembly 42 is in contact with negative electrode terminals 23n of every group of the batteries 23 whose positive electrode terminals 23p are electrically connected to each other by the positive electrode bus bar member 41 so as to electrically connect these negative electrode terminals 23n to each other. In addition, the negative electrode bus bar assembly 42 is covered from the vertically lower side DH by a bottom plate 37 in a recessed-shape and made of aluminum, and reinforcing ribs 37a in a recess-projection shape are formed on an inner side of the bottom plate 37.

The negative electrode bus bar assembly 42 (see FIG. 5) is a composite member formed by arranging and resin-molding a plurality of negative electrode bus bar members 42a made of metallic plates, each of which has the same flat shape as that of the positive electrode bus bar member 41, and is formed with vent holes 42h that are opened in correspondence with the arrangement of the batteries 23. In the above configuration, tongue-shaped negative electrode connecting terminals 42b in contact with the respective negative electrode terminals 23n of the batteries 23 are formed inside the vent holes 42h of the negative electrode bus bar members 42a. As shown in FIG. 4, a rib 42d made of a molded resin and projecting toward the vertically lower side DH is provided around a whole circumferential edge of the negative electrode bus bar assembly 42. The bottom plate 37 provided on the vertically lower side DH of the negative electrode bus bar assembly 42 is fixed such that an outer circumference 37g of the bottom plate 37 comes into air-tight contact with the whole circumference of the rib 42d of the negative electrode bus bar assembly 42.

In this manner, the vertically lower side DH (on the second surface 27b side) of the assembled battery 21 composed by the holder member 25 and the batteries 23 is air-tightly covered by the second-surface shielding member 32 composed by the negative electrode bus bar assembly 42 and the bottom plate 37; and the holder member 25 and the batteries 23 along with the rib 42d of the negative electrode bus bar assembly 42 and the bottom plate 37 define a second chamber RM2 therein.

The positive electrode bus bar members 41 and the negative electrode bus bar members 42a are members for respectively connecting the positive electrode terminals 23p and the negative electrode terminals 23n in a predetermined number (twelve in the present embodiment) of the batteries 23 that belong to the same group so as to connect the batteries 23 in the same group in parallel to one another. Respective battery groups are connected in series to one another by not-illustrated connecting bars; therefore, the battery module 20 (the battery pack 10) is configured by respective battery groups connected in series, each group including the predetermined number of the batteries 23 connected in parallel.

As shown in FIG. 1 and FIG. 2, the cooling air AR, discharged from the cooling fan 103 having taken the air from the vehicle cabin 104, is supplied via a cooling air duct 17 that extends through the inside of a perforated portion 102 formed in the floor panel 101 and a ventilation duct 11*d* provided in an upper part of the pack case 11, and also via a connecting duct 18 to the air flow passage RAR formed in the battery module 20.

As indicated by arrows in FIG. 2 and FIG. 3, the cooling air AR supplied to the air flow passage RAR flows from the slits 33*ss* formed in the side cover part 33*s* on the left side LH of the battery cover 33 into a first chamber RM1 in the battery cover 33 so as to cool the respective batteries 23 accommodated in the first chamber RM1. The air whose temperature is increased after the cooling is discharged from the slits 33*ss* formed in the side cover part 33*s* on the right side RH of the battery cover 33 into the pack case 11 located outside battery module 20 as the returning air BR, further passes through the ventilation duct 11*d* of the pack case 11 and the perforated portion 102 of the floor panel 101, and is then returned into the vehicle cabin 104.

Figure 6:
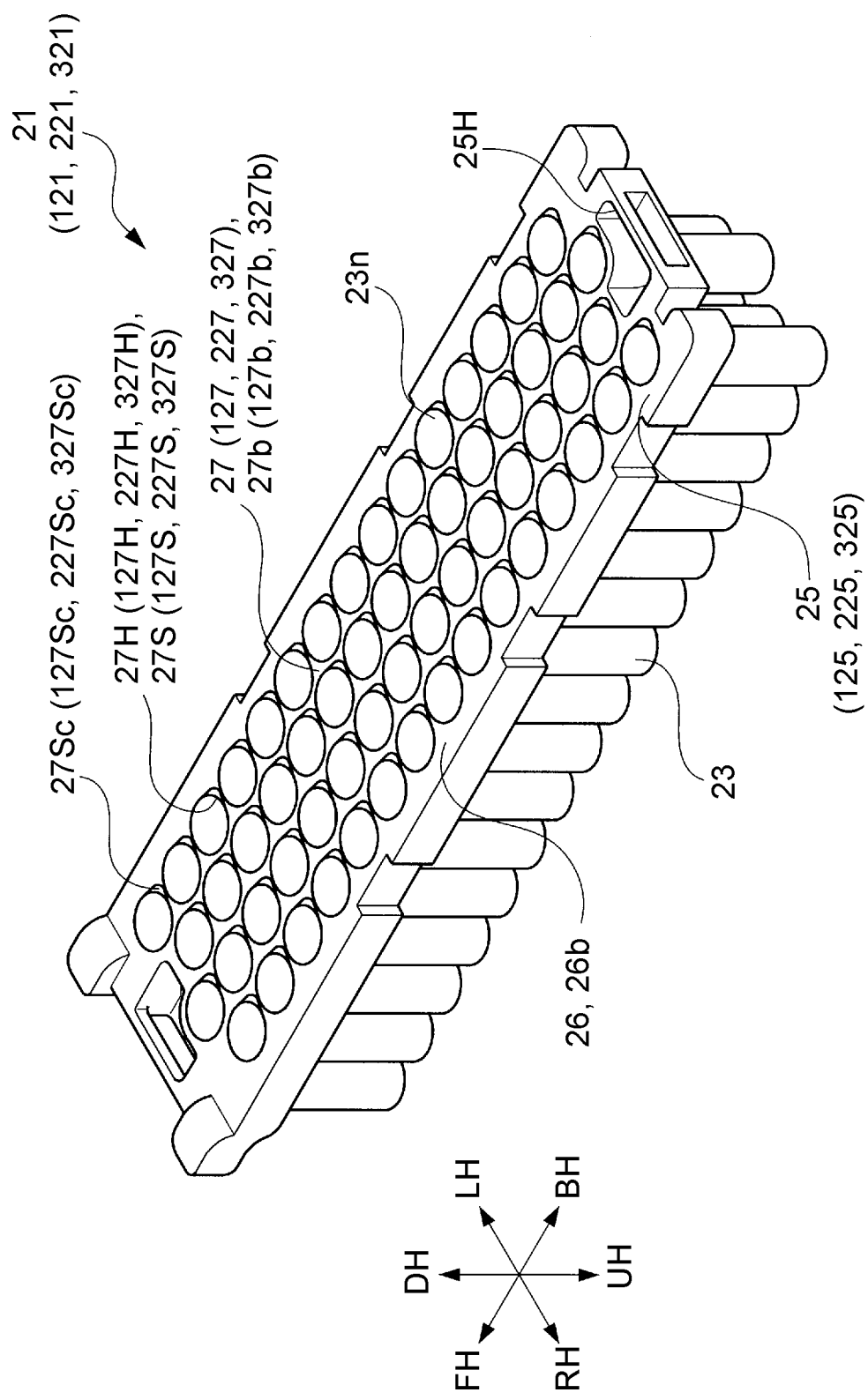
FIG. 6 is a perspective view of the assembled battery according to the embodiment.

As shown in FIG. 5, both ends on the front side FH and the back side BH of the negative electrode bus bar assembly 42 are respectively provided with communication holes 42*t*, each in a generally rectangular shape. As shown in FIG. 5, FIG. 6, the insides of the both ends on the front side FH and on the back side BH of the holder member 25 are provided with L-shaped communication holes 25H that open toward the second surface 27*b* side and the front side FH or the back side BH of the holder member 25. Hence, when the negative electrode bus bar assembly 42 is fixed to the holder member 25 from the vertically lower side DH, the communication holes 42*t* of the negative electrode bus bar assembly 42 overlap with the openings on the vertically lower side DH of the communication holes 25H of the holder member 25 so as to communicate with each other. Accordingly, when the negative electrode bus bar assembly 42 and the bottom plate 37 are attached to the holder member 25 (the assembled battery 21), flow passages, which are composed by the communication holes 42*t* and the communication holes 25H and communicate with the second chamber RM2, are formed.

The negative electrode terminal 23*n* of each battery 23 has a relief valve structure (not illustrated) to be broken and open to release gas when the gas is generated inside the battery 23 and the inner pressure thereof becomes increased. Hence, when the relief valve structure operates, the gas is released from the negative electrode terminal 23*n* of the battery 23 into the second chamber RM2 located on the second surface 27*b* side (the vertically lower side DH) of the holder part 27. The gas released into the second chamber RM2 is discharged from the second surface 27*b* through the communication holes 42*t* and the communication holes 25H, further via a discharge pipe (not illustrated) extending through the pack case 11, to the outside. With this configuration, even when the gas is released from the batteries 23 into the second chamber RM2, the released gas can be discharged to the outside without coming into the vehicle cabin 104.

In addition, as shown in FIG. 4, a bar heater 38 heating the battery module 20 is attached on an outer surface (on the vertically lower side DH) of the rib 37*a* located at a center position in the right and left direction of the bottom plate 37. The bottom plate 37 is heated by heat given off from the bar heater 38. Since the bottom plate 37 is composed by aluminum having a preferable thermal conductivity, the temperature of the entire bottom plate 37 is increased by the heat of the bar heater 38. The air inside the second chamber RM2 located on the vertically upper side UH of the bottom plate 37 is thereby heated and circulated by convection, and the negative electrode terminals 23*n* of the respective batteries 23 are evenly warmed. In this manner, the batteries 23 are heated from the negative electrode terminals 23*n* side (the vertically lower side DH). As described above, since the heat is mutually transferred via the holder member 25 to the batteries 23, it is possible to evenly heat the batteries 23.

In the battery pack 10 according to the present embodiment, the assembled battery 21 itself also functions as a partitioning wall that air-tightly separates the first chamber RM1 and the second chamber RM2 from each other.

Meanwhile, it has been found that among the (sixty in the present embodiment) adhesive bodies 29 with which the gaps SM between the battery through-holes 27H of the holder part 27 of the holder member 25 and the outer circumferential surfaces 23S of the batteries 23 are charged and hardened, some adhesive bodies 29 are not completely present around the whole circumferences of the batteries 23, so that fixation of the batteries 23 to the holder part 27 (holding strength of the holder part 27 for holding the batteries 23) is insufficient; or although fixation of the batteries 23 to the holder part 27 (holding strength of the holder part 27 for holding the batteries 23) is sufficient, some adhesive bodies 29 are hardened with communication passages (vent passages) formed between the first surface 27*a* and the second surface 27*b* such that air-tightness is insufficient.

Such an insufficient fixation of the batteries 23 to the holder part 27 is not preferable, of course. Insufficient air-tightness might cause part of the cooling air AR pressurized and sent into the first chamber RM1 to leak out toward the second chamber RM2 side through the adhesive body 29 whose air-tightness is insufficient; and due to this influence, abnormality occurs in the flow of the cooling air AR inside the first chamber RM1; thus some of the batteries 23 might be insufficiently cooled. In addition, there is a possibility that the relief valve mechanisms of the negative electrode terminals 23*n* of the batteries 23 start operating, and gas released from the batteries toward the second chamber RM2 passes through the adhesive bodies 29 with an insufficient air-tightness into the first chamber RM1, and thus the gas along with the returning air BR reaches the vehicle cabin 104.

Figure 13:
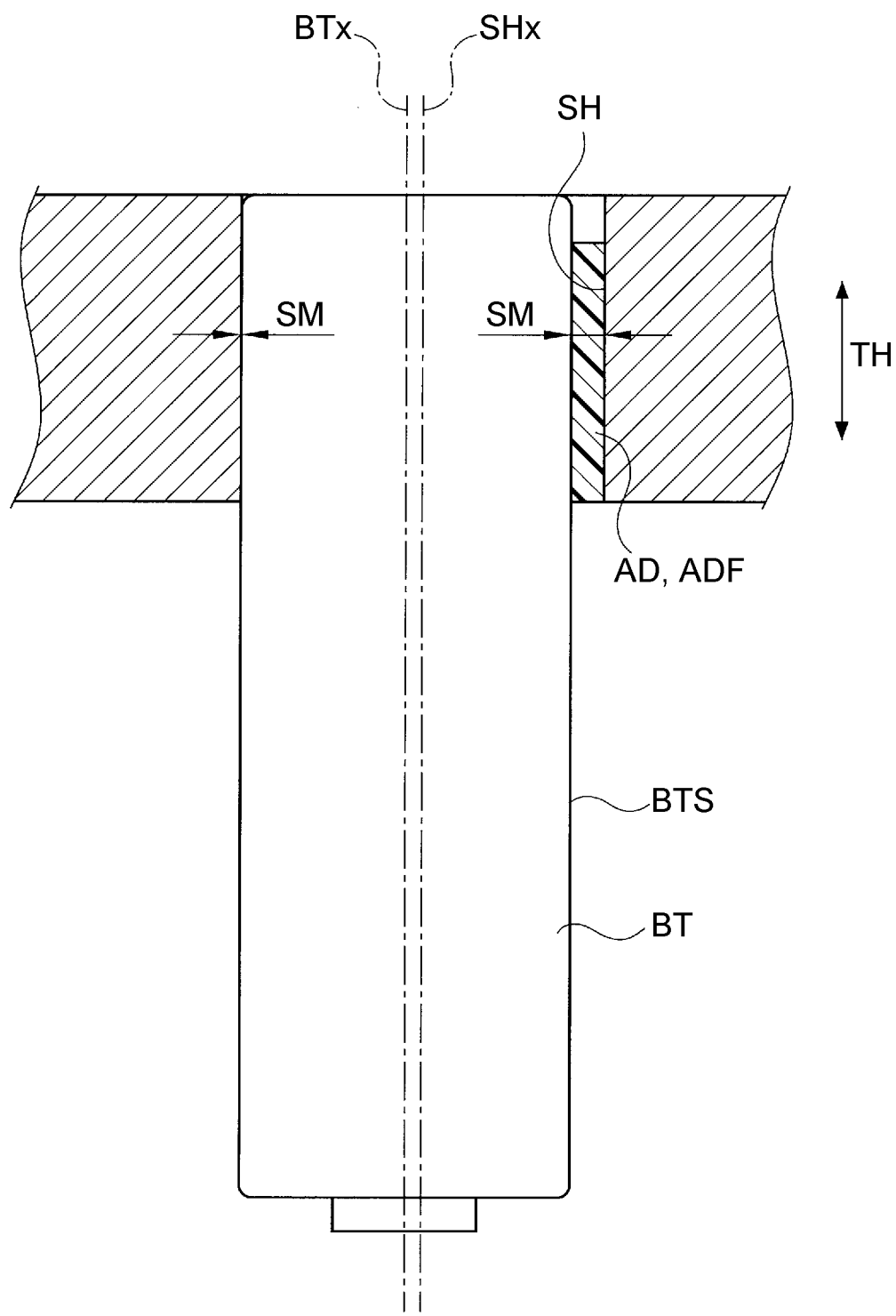
FIG. 13 is a sectional view showing a relation between a battery through-hole and a battery in the case in which the battery inserted into the battery through-hole is eccentrically disposed, according to a reference manner.
Figure 14:
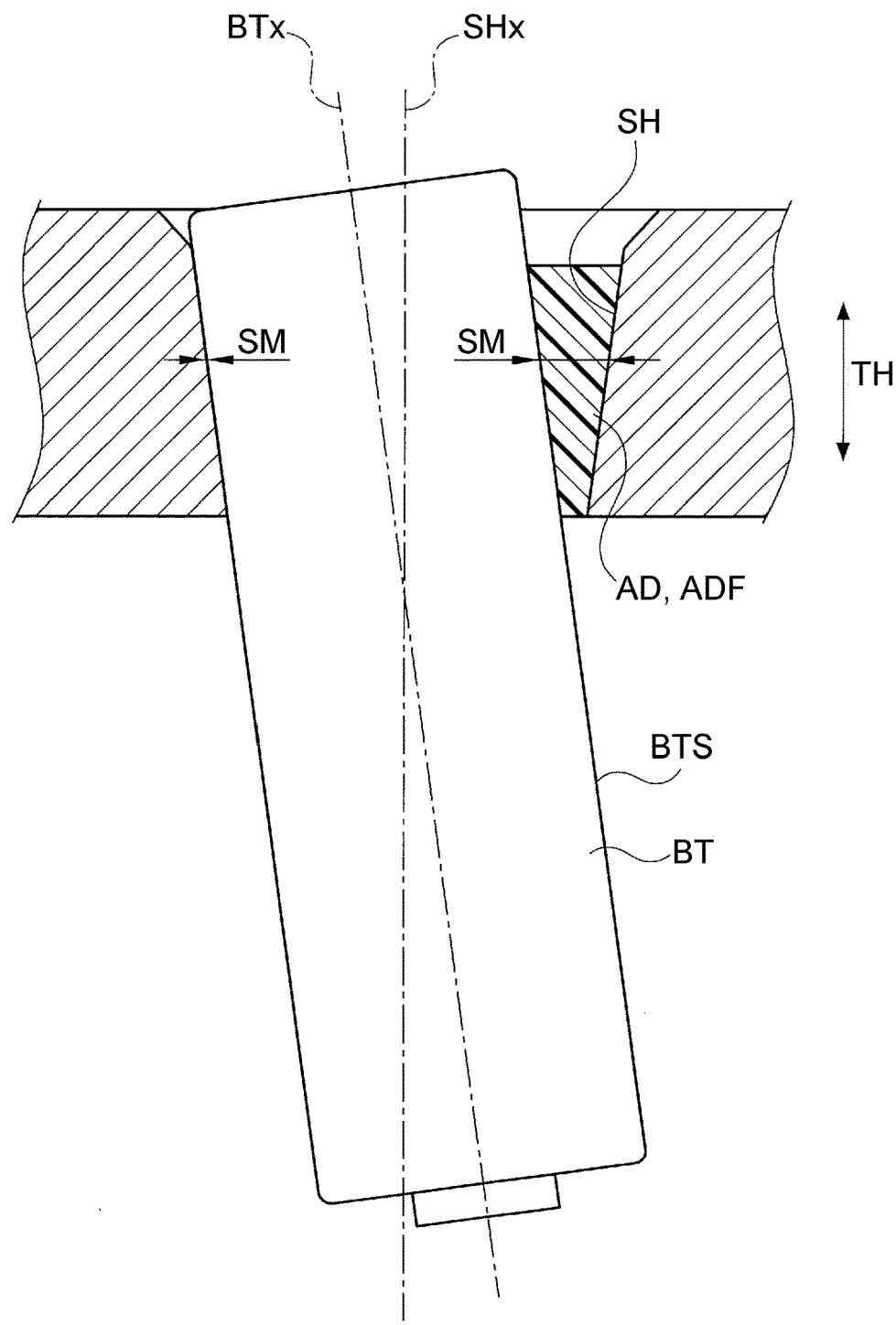
FIG. 14 is a sectional view showing a relation between the battery through-hole and the battery in the case in which the battery inserted into the battery through-hole tilts, according to the reference manner.

Reasons why the adhesive bodies 29 having such insufficient fixation and air-tightness are generated may include such a case, for example, as shown in a reference manner in FIG. 13, that an axis BTx of a battery BT inserted into a battery through-hole SH is disposed at an eccentric position relative to an axis SHx of the battery through-hole SH (on the left in the drawing of FIG. 13), and the gap SM is charged with the adhesive agent AD and the adhesive agent AD is hardened while a circumferential dimension of the gap SM partially becomes extremely small. Furthermore, for example, as shown in FIG. 14, the above reasons may also include such a case that the battery BT is disposed in an inclined posture relative to the battery through-hole SH, and the gap SM is charged with the adhesive agent AD and the adhesive agent AD is hardened while the circumferential dimension of the gap SM partially becomes extremely small.

In the above cases, because the gap SM between the battery through-hole SH and an outer circumferential surface BTS of the battery BT is not uniform across the whole circumference of the battery BT, the adhesive agent AD spreads differently depending on the positions. The adhesive agent AD does not sufficiently spread in the gap SM at a narrower position, and thus there remain some portions where the adhesive agent AD is not charged in the gap SM; consequently, communication passages might be generated in the hardened adhesive body ADF. Normally, the adhesive agent AD after being poured is divided in two different circumferential directions (i.e. in a clockwise direction and a counter clockwise direction relative to the axis BTx) of the battery BT, and two divided pieces of the adhesive agent AD advance and eventually meet to be integrated with each other; but if the divided pieces of the adhesive agent AD advance at different timings in the plate-thickness direction TH and do not meet each other, they cannot be integrated with each other; therefore, there remain some portions where the adhesive agent AD is not charged, which might generate communication passages in the hardened adhesive agent ADF.

Figure 7:
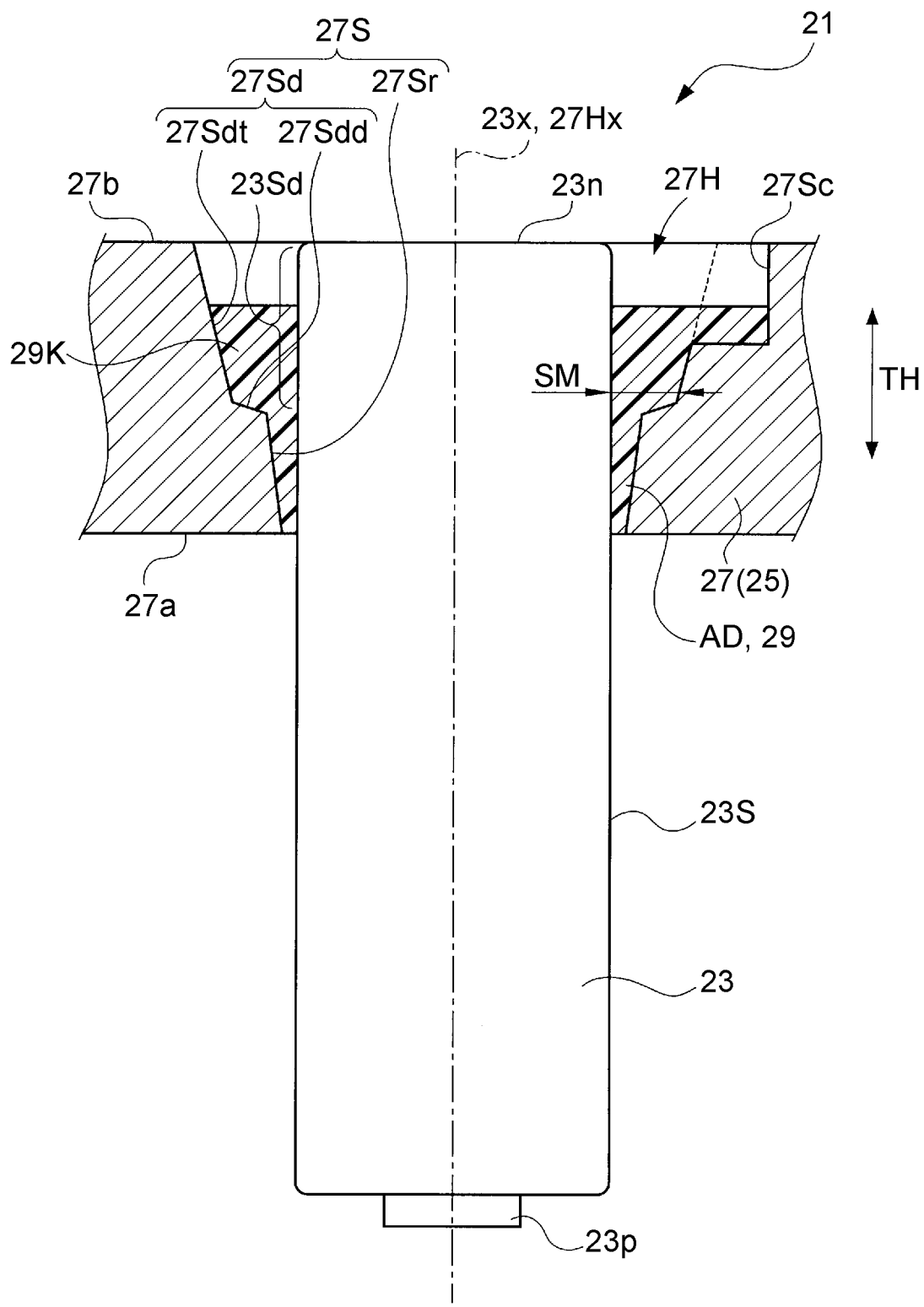
FIG. 7 is a sectional view showing a relation between a battery through-hole, a battery inserted thereinto, and an adhesive body fixing the both of the assembled battery according to the embodiment.

To cope with this, in the assembled battery 21 of the present embodiment, every inner circumferential surface 27S of the sixty battery through-holes 27H that are formed in the holder part 27 of the holder member 25 is formed to have a two-stepped tapered sectional shape shown in FIG. 7. Specifically, the inner circumferential surface 27S of each battery through-hole 27H is provided with a posture restricting portion 27Sr in a tapered shape configured such that of the inner circumferential surface 27S of each battery through-hole 27H, a portion located on the first surface 27a side (the lower side in the drawing) has a relatively small diameter (specifically, a smaller diameter than a departing portion 27Sd described next), and the diameter becomes gradually greater toward the second surface 27b side (the upper side in the drawing). In the meantime, of the inner circumferential surface 27S of each battery through-hole 27H, a portion located closer to the second surface 27b side than the posture restricting portion 27Sr is defined to be the departing portion 27Sd in a tapered shape having a greater diameter than that of the posture restricting portion 27Sr, and this diameter becomes gradually greater toward the second surface 27b side (upper side in the drawing).

Of these components, the posture restricting portion 27Sr is a portion that restricts a range of a posture that can be taken by each inserted battery 23, and restricts the range of the posture that can be taken by each battery 23 inserted into each battery through-holes 27H; and specifically, the posture restricting portion 27Sr restricts an eccentric range that can be taken by each battery 23 and an angle range at which each battery 23 can tilt. In the meantime, the departing portion 27Sd is a portion formed in such a manner as to depart from the whole circumference of the outer circumferential surface 23S of each battery 23 even when the battery 23 takes any posture within the range of the posture restricted by the posture restricting portion 27Sr. Specifically, even when the battery 23 takes any posture within the range restricted by the posture restricting portion 27Sr, the gap SM is formed around the whole circumference between the departing portion 27Sd and a departing-portion opposing portion 23Sd of the outer circumferential surface 23S of each battery 23, the departing-portion opposing portion 23Sd opposing the departing portion 27Sd.

Figure 8:
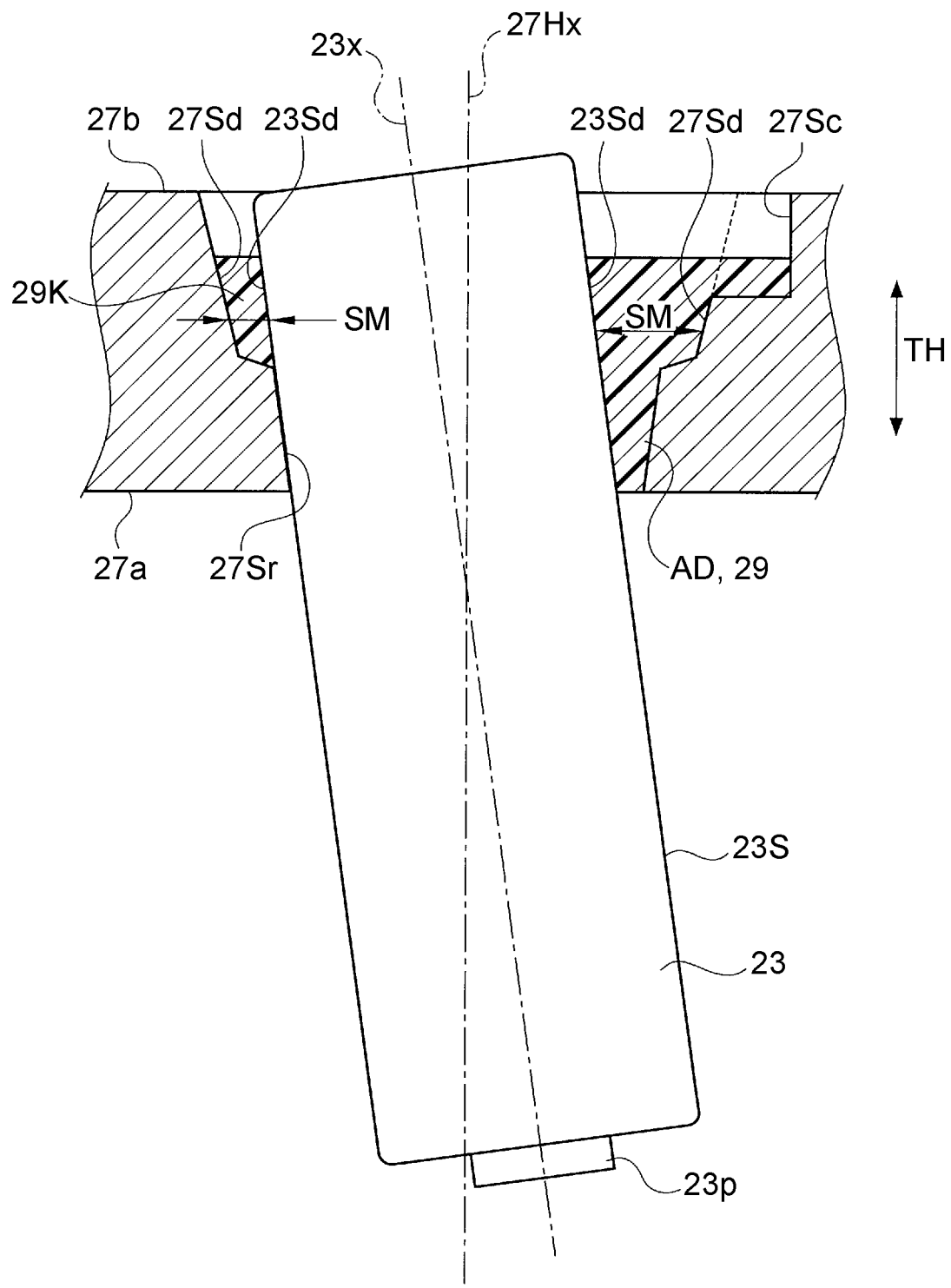
FIG. 8 is a sectional view showing a relation between the battery through-hole and the battery in the case in which the battery inserted into the battery through-hole tilts, according to the embodiment.

To be specific, as shown in FIG. 7, not only when an axis 23x of each battery 23 coincides with the axis 27Hx of each battery through-hole 27H, but also when the axis 23x of the battery 23 is eccentric relative to the axis 27Hx of the battery through-holes 27H (see FIG. 13), the gap SM is formed around the whole circumference between the departing-portion opposing portion 23Sd of each battery 23 and the departing portion 27Sd of each battery through-hole 27H. In addition, as with the case in FIG. 14, as shown in FIG. 8, even when the axis 23x of the battery 23 tilts relative to the axis 27Hx of the battery through-hole 27H and the battery 23 is put into a posture in which the outer circumferential surface 23S of the battery 23 comes into contact with the posture restricting portion 27Sr in a tapered shape of the battery through-hole 27H, the gap SM is also formed around the whole circumference between the departing-portion opposing portion 23Sd and the departing portion 27Sd.

Therefore, even when the battery 23 inserted into the battery through-hole 27H takes any posture, by pouring a sufficient amount of the adhesive agent AD, it is possible to allow the adhesive agent AD to wettingly spread around the whole circumference of the gap SM between the departing-portion opposing portion 23Sd of the battery 23 and the departing portion 27Sd of the battery through-hole 27H so as to combine the departing portion 27Sd and the departing-portion opposing portion 23Sd with each other around the whole circumference with the unhardened adhesive agent AD. By hardening (solidifying) this adhesive agent AD, it is possible to form the adhesive body 29 including a whole-circumferential combined portion 29K where the departing portion 27Sd and the departing-portion opposing portion 23Sd are combined with each other by the hardened adhesive agent AD around the whole circumference of the battery 23. Hence, in this assembled battery 21, it is possible to securely fix each battery 23 into each battery through-hole 27H of the holder part 27 around the whole circumference. With this, it is possible to configure the assembled battery 21 such that for every battery 23, the gap between the battery through-hole 27H and the battery 23 inserted in the battery through-hole 27H is air-tightly sealed in the plate-thickness direction TH; in addition to this, it is also possible to allow the holder member 25 and the respective batteries 23 to function as the partitioning walls that secure the air-tightness in the plate-thickness direction TH in the holder part 27.

In addition, in the assembled battery 21 of the present embodiment, the inner circumferential surface 27S defining each battery through-hole 27H of the holder part 27 is formed with a liquid-pouring groove 27Sc extending from the second surface 27b to the departing portion 27Sd so as to guide the adhesive agent AD into the departing portion 27Sd.

By providing such a liquid-pouring groove 27Sc, it is possible to readily supply the unhardened adhesive agent AD to the departing portion 27Sd through the liquid-pouring groove 27Sc. By providing the liquid-pouring groove 27Sc, it is possible to temporarily retain the adhesive agent AD having been poured into the liquid-pouring groove 27Sc by a volume between the outer circumferential surface 23S of each battery 23 and the liquid-pouring groove 27Sc, and thereafter, it is possible to allow the adhesive agent AD to spread in the circumferential direction of the departing portion 27Sd at a spreading speed depending on the viscosity of the adhesive agent AD. Accordingly, it is possible to reduce the frequencies and the time required for pouring the adhesive agent AD, to thereby manufacture the assembled battery 21 at a lower cost.

In the present embodiment, as can be readily seen from FIG. 6, each battery through-hole 27H (each inner circumferential surface 27S) is provided with a single liquid-pouring groove 27Sc. With this configuration, the advancing direction of the spreading (flowing around) resulting from the liquid flow of the adhesive agent AD between the departing portion 27Sd and the departing-portion opposing portion 23Sd can be restricted to two directions (the clockwise direction and the counter-clockwise direction in the circumferential direction of the battery 23 from the liquid-pouring groove 27Sc); therefore, compared with the case of providing a plurality of liquid-pouring grooves 27Sc, it is possible to suppress such a possibility that front ends of the pieces of the adhesive agent AD advancing in the inverse directions to each other do not eventually meet each other and become integrated with each other, resulting in generation of communication passages in the adhesive body 29.

In addition, in the assembled battery 21 of the present embodiment, every inner circumferential surface 27S of each battery through-hole 27H is provided with the posture restricting portion 27Sr whose diameter is smaller than that of the departing portion 27Sd, at a position closer to the first surface 27a side (in the lower side in FIG. 7) in the plate-thickness direction TH than the departing portion 27Sd. Hence, it is possible not only to restrict the range of the posture taken by the battery 23 by the posture restricting portion 27Sr with a smaller diameter, but also to suppress the unhardened adhesive agent AD having been poured to the departing portion 27Sd from dropping down toward the first surface 27a side; therefore, it is possible to manufacture the assembled battery 21 having the adhesive body 29 where the whole-circumferential combined portion 29K is securely formed between the departing portion 27Sd and the departing-portion opposing portion 23Sd.

Figure 9:
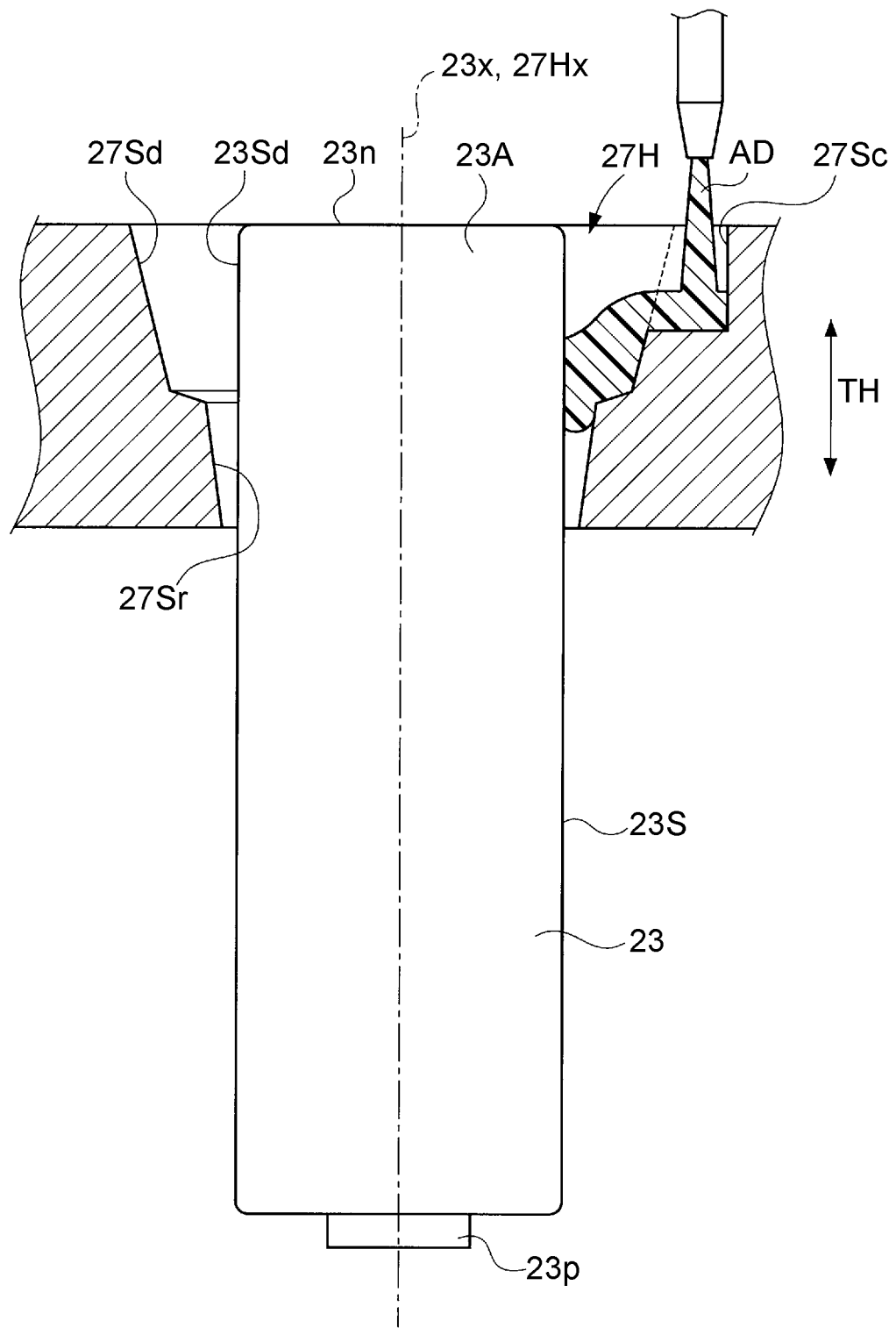
FIG. 9 is an explanatory view showing a state in which an adhesive agent is poured into the battery through-hole into which the battery is inserted, according to the embodiment.

Next, a procedure of assembling the batteries 23 to the holder part 27 of the holder member 25 so as to compose the assembled battery 21 will be described with reference to FIG. 9. In an insertion step, the respective batteries 23 are inserted into the battery through-holes 27H of the holder part 27. Specifically, the negative electrode ends 23A on the negative electrode terminals 23n side of the batteries 23 are inserted into the battery through-holes 27H.

Subsequently, as a pouring-combining step, in a state in which the holder member 25 into which the batteries 23 are inserted is set into a posture where the second surface 27b of the holder part 27 faces upward (see FIG. 9), the unhardened adhesive agent AD is poured between the departing portion 27Sd of each inner circumferential surface 27S of the holder part 27 and the departing-portion opposing portion 23Sd of the outer circumferential surfaces 23S of each battery 23; the unhardened adhesive agent AD is brought to spread between the departing portion 27Sd and the departing-portion opposing portion 23Sd around the whole circumference of each battery 23 so as to combine the departing portion 27Sd and the departing-portion opposing portion 23Sd with each other by the unhardened adhesive agent AD around the whole circumference of each battery 23 (see FIG. 7).

Next, in a hardening step, the unhardened adhesive agent AD is hardened so as to form the adhesive body 29 between the inner circumferential surface 27S of the holder part 27 and the outer circumferential surface 23S of each battery 23.

Through this, each of the adhesive bodies 29 includes the whole-circumferential combined portion 29K formed by the hardened adhesive agent AD combined at least between the departing portion 27Sd of the holder part 27 and the departing-portion opposing portion 23Sd of each battery 23. Hence, in the assembled battery 21, each battery 23 can securely be fixed and held into each battery through-hole 27H of the holder part 27 around the whole circumference of the battery. In addition, in the pouring-combining step, the unhardened adhesive agent AD is poured between the departing portion 27Sd and the departing-portion opposing portion 23Sd through the liquid-pouring grooves 27Sc. By carrying out this, it is possible to securely pour the unhardened adhesive agent AD between the departing portion 27Sd and the departing-portion opposing portion 23Sd. In addition to this, the gap between each battery through-hole 27H and each battery 23 inserted into this battery through-hole 27H is air-tightly sealed in the plate-thickness direction TH. Through this, it is possible to manufacture the assembled battery 21 in which not only each battery 23 can be securely fixed into each battery through-hole 27H of the holder part 27 around the whole circumference, but also a flow of gas or the like flowing through the gaps SM between the battery through-holes 27H of the holder part 27 and the batteries 23 can be prevented. Accordingly, it is possible to compose the assembled battery 21 by the respective batteries 23, and also to bring the holder member 25 and the batteries 23 to function as the partitioning walls that secure air-tightness in the plate-thickness direction TH in the holder part 27.

In the present embodiment, as described above, each inner circumferential surface 27S of the holder part 27 is provided with a single liquid-pouring groove 27Sc. Hence, the adhesive agent AD is poured into this single liquid-pouring groove 27Sc, and the unhardened adhesive agent AD is poured to the departing portion 27Sd through the liquid-pouring groove 27Sc. Through this, it is possible to more securely pour the unhardened adhesive agent AD between the departing portion 27Sd and the departing-portion opposing portion 23Sd.

Furthermore, in the present embodiment, based on the configuration that each inner circumferential surface 27S is provided with the single liquid-pouring groove 27Sc as described above, the above pouring-combining step is defined to be a repetitive pouring-combining step in which the pouring of the unhardened adhesive agent AD is repetitively carried out between the outer circumferential surface 23S of every battery 23 and every inner circumferential surface 27S of the holder part 27 in the predetermined procedure.

At the time of pouring the adhesive agent AD between the departing portion 27Sd and the departing-portion opposing portion 23Sd via the liquid-pouring groove 27Sc, if a necessary amount of the adhesive agent AD to be poured is too great in proportion to a volume of the liquid-pouring groove 27Sc because a volume of the gap between the departing portion 27Sd and the departing-portion opposing portion 23Sd is too great in proportion to the volume of the liquid-pouring groove 27Sc, or the like, the adhesive agent AD might flow over from the liquid-pouring groove 27Sc when the adhesive agent AD is attempted to be poured in a short time; consequently, it might be impossible to pour the necessary amount of the adhesive agent AD at a time in a short time.

On the other hand, in the present embodiment, the aforementioned repetitive pouring-combining step is carried out. With this, for every battery 23, it is possible to pour the necessary amount of the adhesive agent AD, more securely bring the adhesive agent AD to spread around the whole circumference, and combine the departing portion 27Sd and the departing-portion opposing portion 23Sd with each other around the whole circumference of each battery 23 with the unhardened adhesive agent AD. Accordingly, it is possible to provide air-tight sealing between the battery through-holes 27H and the batteries 23 inserted thereinto in the plate-thickness direction TH.

In the pouring-combining step and the hardening step, the range of the posture taken by each battery 23 is restricted by the posture restricting portion 27Sr having a smaller diameter, and the unhardened adhesive agent AD having been poured in the departing portion 27Sd is suppressed from dropping down toward the first surface 27a side; thus, it is possible to manufacture the assembled battery 21 in which the whole-circumferential combined portion 29K of each adhesive body 29 is more securely formed between each departing portion 27Sd and each departing-portion opposing portion 23Sd.

First Modification

Hereinafter, an assembled battery 121 of the first modification of the present embodiment will be described. In the above embodiment, the inner circumferential surface 27S of each battery through-hole 27H formed in the holder part 27 of the holder member 25 is formed in the two-stepped tapered shape with the liquid-pouring groove 27Sc as shown in FIG. 7.

Figure 10:
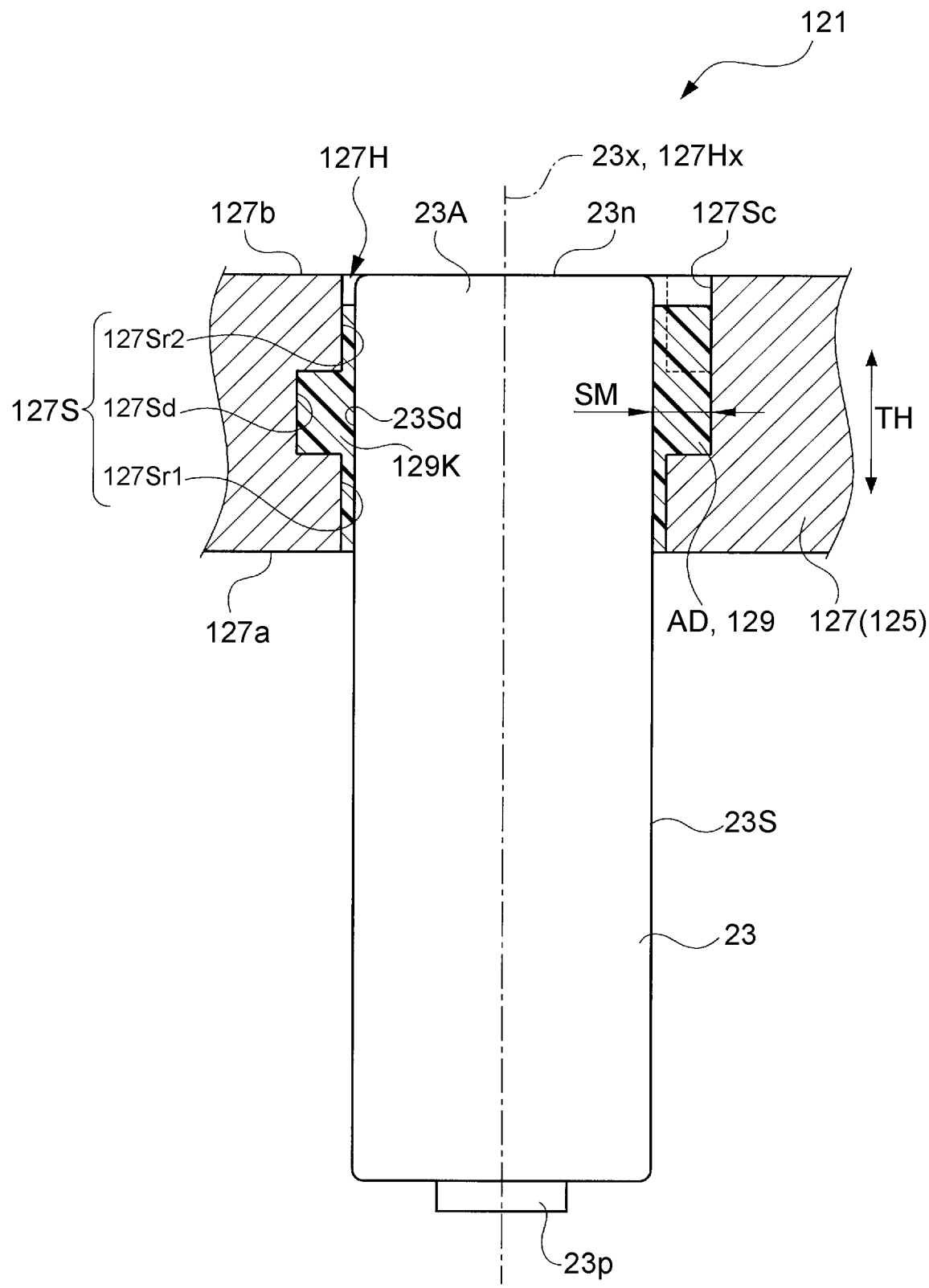
FIG. 10 is a sectional view showing a relation between a battery through-hole, a battery inserted thereinto, and an adhesive body fixing the both of an assembled battery according to a first modification.

On the other hand, in the present first modification, as shown in FIG. 10, a shape of an inner circumferential surface 127S of each battery through-hole 127H in a holder part 127 of a holder member 125 is formed in a three-stepped cylindrical shape whose middle step is greater. That is, provided are battery through-holes 127H, each having an inner circumferential surface 127S in a three-stepped cylindrical shape whose middle step is greater, each inner circumferential surface 127S being configured such that a first posture restricting portion 127Sr1 in a cylindrical shape having a smaller diameter than that of a departing portion 127Sd is provided on the first surface 127a side in the plate-thickness direction TH, a second posture restricting portion 127Sr2 in a cylindrical shape having a smaller diameter than that of the departing portion 127Sd is provided on the second surface 127b side in the plate-thickness direction TH, and the departing portion 127Sd having a greater diameter than those of the posture restricting portions 127Sr1, 127Sr2 is provided between these two posture restricting portions 127Sr1, 127Sr2.

Also in the assembled battery 121 of the present first modification having the holder part 127 configured in the above manner, even when each battery 23 inserted in each battery through-hole 127H takes any posture, by pouring a sufficient amount of the adhesive agent AD, it is possible to bring the adhesive agent AD to wettingly spread around the whole circumference of the gap SM between the departing-portion opposing portion 23Sd of each battery 23 and the departing portion 27Sd of each battery through-hole 27H so as to combine the departing portion 127Sd and the departing-portion opposing portion 23Sd with each other with the unhardened adhesive agent AD around the whole circumference. By hardening (solidifying) this adhesive agent AD, it is possible to form an adhesive body 129 including a whole-circumferential combined portion 129K formed by the hardened adhesive agent AD that combines the departing portion 127Sd and the departing-portion opposing portion 23Sd with each other around the whole circumference of each battery 23; and in addition to the above, it is possible to configure the assembled battery 121 such that for every battery 23, the gap between the battery through-hole 127H and the battery 23 inserted in the battery through-hole 127H are air-tightly sealed in the plate-thickness direction TH.

Since the first posture restricting portion 127Sr1 is provided, in the pouring-combining step and the hardening step, it is also possible for the first posture restricting portion 127Sr1 to not only restrict the range of the posture taken by the battery 23, but also suppress the unhardened adhesive agent AD having been poured to the departing portion 27Sd from dropping down toward the first surface 127a side; therefore, it is possible to manufacture the assembled battery 121 in which the whole-circumferential combined portion 129K of the adhesive body 129 is more securely formed between the departing portion 127Sd and the departing-portion opposing portion 23Sd.

Furthermore, since the posture restricting portions 127Sr1, 127Sr2 are provided at two positions apart from each other in the plate-thickness direction TH while the departing portion 127Sd is interposed therebetween, in the pouring-combining step and the hardening step, the assembled battery 121 having this holder part 127 can further readily and securely restrict the range of the posture taken by each battery 23.

Also in each battery through-hole 127H of the present first modification, a single liquid-pouring groove 127Sc reaching the departing portion 127Sd is provided on the inner circumferential surface 127S. Including this liquid-pouring groove 127Sc, the other components are the same as those of the above embodiment, and thus description thereof will be omitted. The same components as those of the above embodiment can also attain the same operation and effect.

Second Modification

Next, an assembled battery 221 of the second modification of the present embodiment will be described. In the above first modification, the inner circumferential surface 127S of each battery through-hole 127H formed in the holder part 127 of the holder member 125 is formed in a three-stepped cylindrical shape whose middle step is greater, as shown in FIG. 10.

Figure 11:
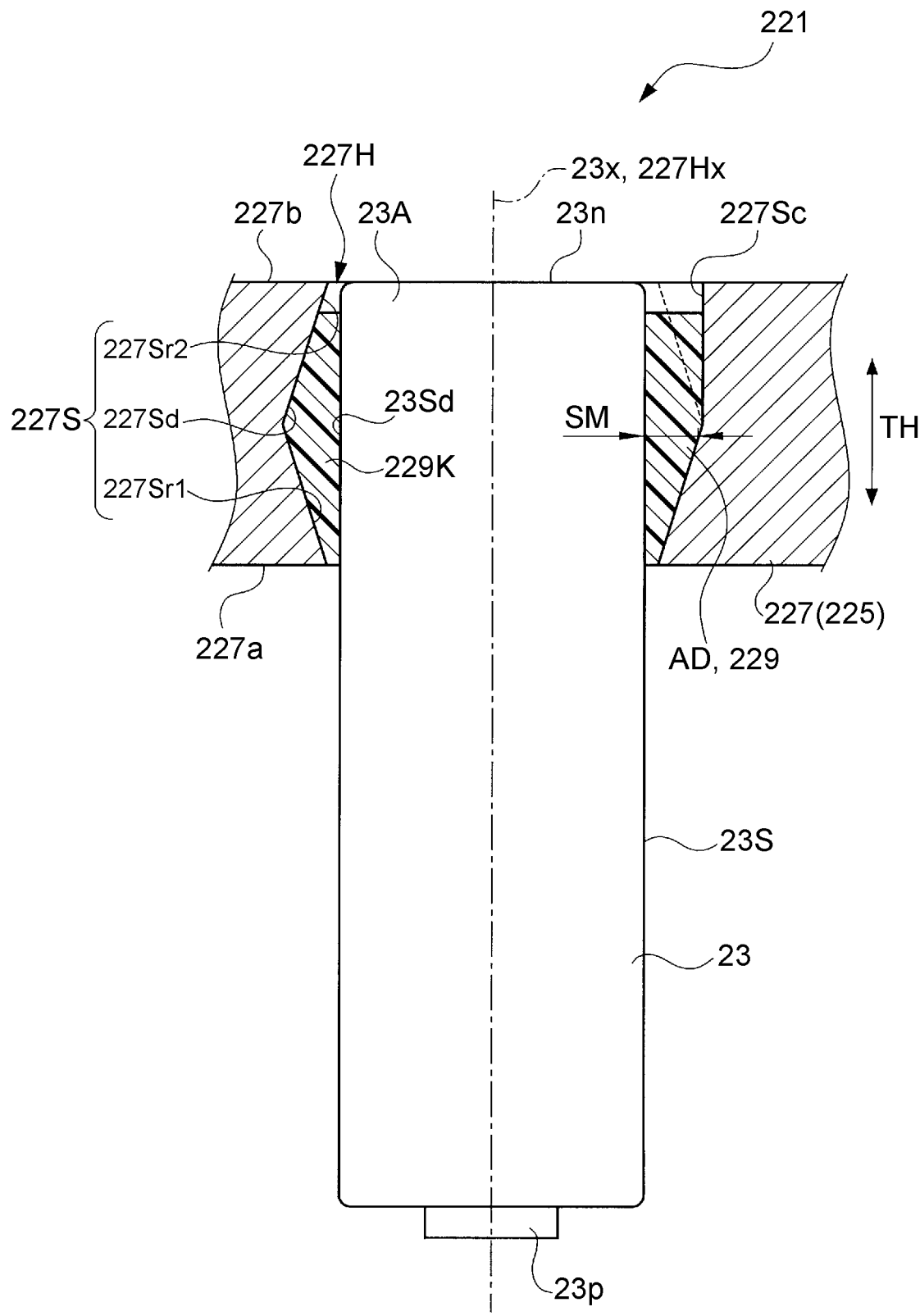
FIG. 11 is a sectional view showing a relation between a battery through-hole, a battery inserted thereinto, and an adhesive body fixing the both of an assembled battery according to a second modification.

On the other hand, in the present second modification, as shown in FIG. 11, of an inner circumferential surface 227S of each battery through-hole 227H in a holder part 227 of a holder member 225, an end on a first surface 227a side in the plate-thickness direction TH is defined to be a first posture restricting portion 227Sr1 having a smaller diameter, an end on a second surface 227b side is defined to be a second posture restricting portion 227Sr2 having a smaller diameter, and the diameter is formed to be gradually greater toward the center in the plate-thickness direction TH, and this portion is defined to be a departing portion 227Sd.

Also in the assembled battery 221 of the present second modification, even when each battery 23 inserted in each battery through-hole 227H takes any posture, by pouring a sufficient amount of the adhesive agent AD, it is possible to combine the departing portion 227Sd and the departing-portion opposing portion 23Sd with each other around the whole circumference with the unhardened adhesive agent AD. By hardening this unhardened adhesive agent AD, it is possible to form an adhesive body 229 including a whole-circumferential combined portion 229K formed by the hardened adhesive agent AD that combines the departing portion 227Sd and the departing-portion opposing portion 23Sd with each other around the whole circumference; and in addition to the above, it is possible to configure the assembled battery 221 such that for every battery 23, the gap between the battery through-hole 227H and the battery 23 inserted in the battery through-hole 227H is air-tightly sealed in the plate-thickness direction TH.

In addition, since the first posture restricting portion 227Sr1 having a smaller diameter is provided, in the pouring-combining step and the hardening step, it is also possible for the first posture restricting portion 227Sr1 to not only restrict the range of the posture taken by the battery 23, but also suppress the unhardened adhesive agent AD having been poured to the departing portion 227Sd from dropping down toward the first surface 227a side; therefore, it is possible to manufacture the assembled battery 221 in which the whole-circumferential combined portion 229K of the adhesive body 229 is more securely formed between the departing portion 227Sd and the departing-portion opposing portion 23Sd.

Furthermore, since the posture restricting portions 227Sr1, 227Sr2 are provided at two positions apart from each other in the plate-thickness direction TH while the departing portion 227Sd is interposed therebetween, in the pouring-combining step and the hardening step, the assembled battery 221 having the holder part 227 can further readily and securely restrict the range of the posture taken by each battery 23.

Also in each battery through-hole 227H of the present second modification, a single liquid-pouring groove 227Sc reaching the departing portion 227Sd is provided on the inner circumferential surface 227S. Including this liquid-pouring groove 227Sc, the other components are the same as those of the above embodiment, and thus description thereof will be omitted. The same components as those of the above embodiment and the first modification can attain the same operation and effect.

Third Modification

Hereinafter, an assembled battery 321 of the third modification of the present embodiment will be described. In the above first and second modifications, the posture restricting portions are provided on the first surface side and on the second surface side in the plate-thickness direction, and the departing portion is provided between these two posture restricting portions (see FIG. 10, FIG. 11).

Figure 12:
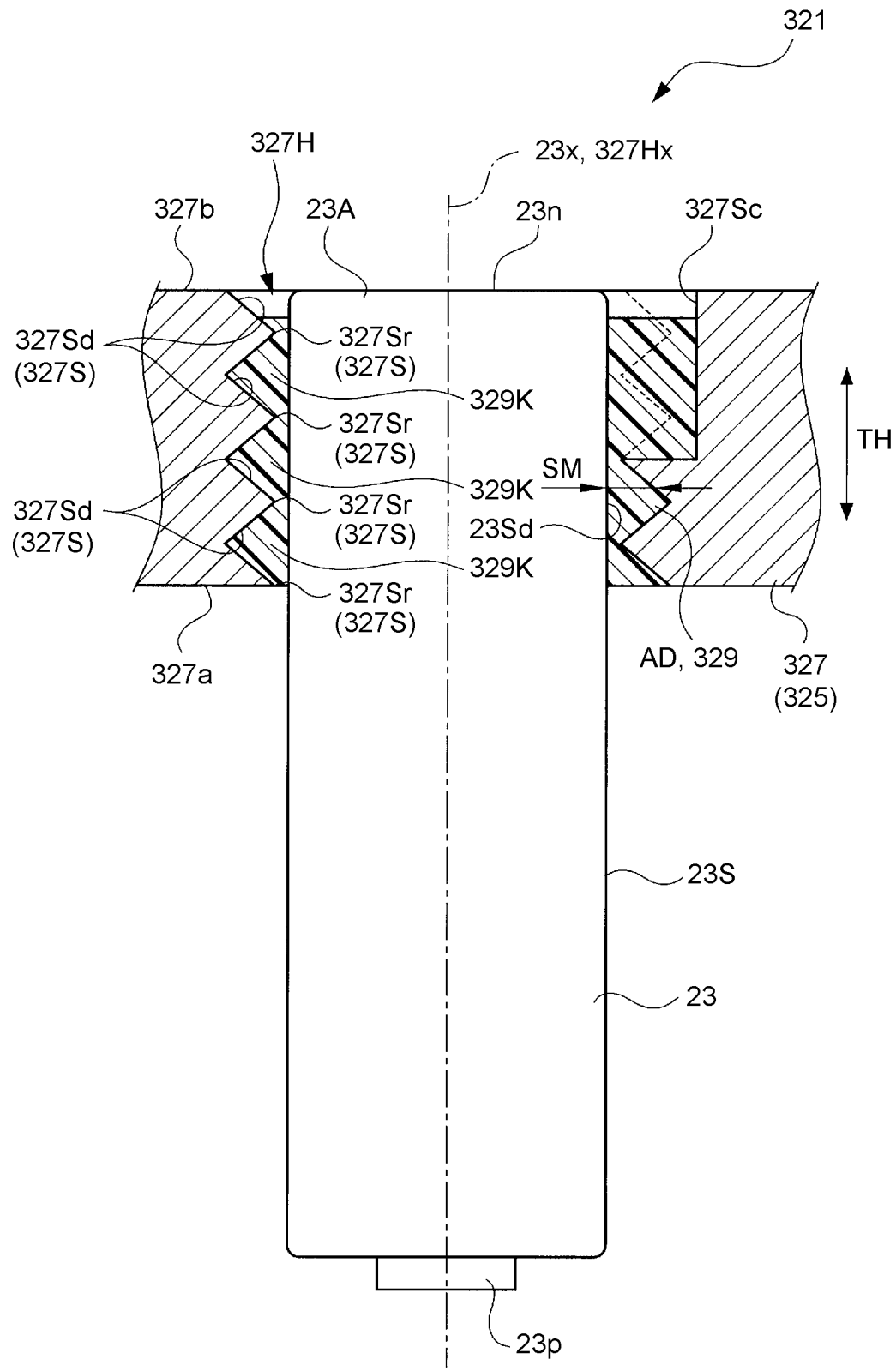
FIG. 12 is a sectional view showing a relation between a battery through-hole, a battery inserted thereinto, and an adhesive body fixing the both of an assembled battery according to a third modification.

On the other hand, in the present third modification, as shown in FIG. 12, an inner circumferential surface 327S of each battery through-hole 327H in the holder part 327 of the holder member 325 is formed in a female-screw shape, and of the inner circumferential surface 327S, a spiral ridge projecting in the radially inward direction is defined to be a posture restricting portion 327Sr and a spiral trough recessed in the radially outward direction is defined to be a departing portion 327Sd. In other words, the posture restricting portion 327Sr as the ridge and the departing portion 327Sd as the trough are arranged in a double helix form.

Also in the assembled battery 321 of the present third modification, even when each battery 23 inserted in each battery through-hole 327H takes any posture, by pouring a sufficient amount of the adhesive agent AD, it is possible to combine the departing portion 327Sd and the departing-portion opposing portion 23Sd with each other around the whole circumference with the unhardened adhesive agent AD. In at least part of the whole circumference, the gap between the posture restricting portion 327Sr and the outer circumferential surfaces 23S of each battery 23 is supplied with the adhesive agent AD such that the departing portion 327Sd and the departing-portion opposing portion 23Sd that are vertically located in the plate-thickness direction TH are combined with each other with the adhesive agent AD through the portion between the posture restricting portion 327Sr and the outer circumferential surfaces 23S. Hence, by hardening this adhesive agent AD, it is possible to form an adhesive body 329 including a whole-circumferential combined portion 329K formed by the hardened adhesive agent AD that combines the departing portion 327Sd and the departing-portion opposing portion 23Sd with each other around the whole circumference; and in addition to the above, it is possible to configure the assembled battery 321 such that for every battery 23, the gap between the battery through-hole 327H and the battery 23 inserted in the battery through-hole 327H is air-tightly sealed in the plate-thickness direction TH.

Also in each battery through-hole 327H of the present third modification, a single liquid-pouring groove 327Sc reaching the departing portion 327Sd is provided on the inner circumferential surface 327S. Including this liquid-pouring groove 327Sc, the other components are the same as those of the above embodiment, and thus description thereof will be omitted. The same components as those of the above embodiment and the first modification can attain the same operation and effect.

As described above, the present technique has been explained in conjunction with the embodiment and the first to third modifications, but the present technique is not restricted to the above embodiment and others, and may be appropriately changed and applied without departing from the scope of the disclosure. For example, in the above embodiment, the cooling air AR from the cooling fan 103 disposed outside the battery pack 10 (inside the vehicle cabin 104) is introduced using the cooling air duct 17, further via the air flow passage RAR, into the battery module 20 of the battery pack 10. However, for example, the cooling fan may be directly attached to the pack case 11 of the battery pack 10 or to the first-surface shielding member 31 of the battery module 20. In addition, depending on the usage condition of the assembled battery, when the batteries 23 are not cooled, the respective batteries 23 may be sealed in such a manner that the first surface 27a side of the holder part 27 is air-tightly covered by the first-surface shielding member.

What is claimed is:

1. An assembled battery comprising:
 a plurality of cylindrical batteries;
 a holder having a holder part, the holder part formed in a plate-like shape having a first surface and a second surface that is a back surface of the first surface, the holder part including a plurality of battery through-holes extending through the holder in a plate-thickness direction, the holder part configured to hold outer circumferential surfaces of the cylindrical batteries respectively inserted in the battery through-holes; and
 a plurality of adhesive bodies including an adhesive agent hardened between the outer circumferential surfaces of the cylindrical batteries and inner circumferential surfaces defining the battery through-holes of the holder part, the adhesive bodies combining the outer circumferential surfaces of the cylindrical batteries and the inner circumferential surfaces of the holder part with each other,
 wherein
 the inner circumferential surfaces of the holder part defining the battery through-holes include:
 posture restricting portions configured to restrict ranges of postures taken by the cylindrical batteries inserted in the battery through-holes;
 departing portions configured to depart from the outer circumferential surfaces of the cylindrical batteries around whole circumferences even when the cylindrical batteries take any posture in the range of the postures restricted by the posture restricting portions; and liquid-pouring grooves connected from the second surface to the departing portions, the adhesive bodies include whole-circumferential combined portions formed by a hardened adhesive agent that combines at least the departing portions of the inner circumferential surfaces of the holder part with departing-portion opposing portions of the outer circumferential surfaces of the cylindrical batteries, the departing-portion opposing portions opposing the departing portions, around the whole circumferences of the cylindrical batteries, and each of the liquid-pouring grooves is a partial circumference part, of a respective one of the battery through-holes, that connects the second surface and a respective one of the departing portions to each other, and that is recessed in a radially outward direction such that the liquid- pouring groove is further from a center axis of the respective one of the battery through-holes than a circumference part of the respective one of the battery through-holes that opposes the liquid-pouring groove and is connected to the second surface.

2. The assembled battery according to claim 1, wherein the adhesive bodies provide air-tight sealing between the battery through-holes and the cylindrical batteries inserted in the battery through-holes in the plate-thickness direction.

3. The assembled battery according to claim 1, wherein the posture restricting portions include first posture restricting portions located closer to the first surface than the departing portions in the plate-thickness direction, and diameters of the first posture restricting portions are smaller than diameters of the departing portions.

4. An assembled battery comprising:

a plurality of cylindrical batteries;

a holder having a holder part, the holder part formed in a plate-like shape having a first surface and a second surface that is a back surface of the first surface, the holder part including a plurality of battery through-holes extending through the holder in a plate-thickness direction, the holder part configured to hold outer circumferential surfaces of the cylindrical batteries respectively inserted in the battery through-holes; and a plurality of adhesive bodies including an adhesive agent hardened between the outer circumferential surfaces of the cylindrical batteries and inner circumferential surfaces defining the battery through-holes of the holder part, the adhesive bodies combining the outer circumferential surfaces of the cylindrical batteries and the inner circumferential surfaces of the holder part with each other, wherein the inner circumferential surfaces of the holder part defining the battery through-holes include:

posture restricting portions configured to restrict ranges of postures taken by the cylindrical batteries inserted in the battery through-holes;

departing portions configured to depart from the outer circumferential surfaces of the cylindrical batteries around whole circumferences even when the cylindrical batteries take any posture in the range of the postures restricted by the posture restricting portions; and liquid-pouring grooves connected from the second surface to the departing portions, the adhesive bodies include whole-circumferential combined portions formed by a hardened adhesive agent that combines at least the departing portions of the inner circumferential surfaces of the holder part with departing-portion opposing portions of the outer circumferential surfaces of the cylindrical batteries, the departing-portion opposing portions opposing the departing portions, around the whole circumferences of the cylindrical batteries, the posture restricting portions include first posture restricting portions located closer to the first surface than the departing portions in the plate-thickness direction, diameters of the first posture restricting portions are smaller than diameters of the departing portions, the posture restricting portions include second posture restricting portions located closer to the second surface than the departing portions in the plate-thickness direction, and diameters of the second posture restricting portions are smaller than diameters of the departing portions.

5. A battery module comprising:

the assembled battery according to claim 1; and a first-surface shielding member configured to cover the holder part of the holder and the cylindrical batteries of the assembled battery from a side of the first surface so as to be air-tightly combined with the holder.

6. A manufacturing method for an assembled battery, the method comprising:

inserting a plurality of cylindrical batteries into a plurality of battery through-holes of a holder part, the holder part being in a plate-like shape and including a first surface and a second surface that is a back surface of the first surface, the battery through-holes extending through the holder part in a plate-thickness direction of the holder part, a plurality of inner circumferential surfaces of the holder part, defining the battery through-holes, the inner circumferential surfaces including: posture restricting portions each of which is configured to restrict a range of a posture taken by each of the cylindrical batteries inserted in the battery through-holes; departing portions configured to depart from outer circumferential surfaces of the cylindrical batteries around whole circumferences even when the cylindrical batteries take any postures within the ranges of the postures restricted by the posture restricting portions; and liquid-pouring grooves connected from the second surface to the departing portions;

in a state in which the holder part in which the cylindrical batteries are inserted is put into a posture where the second surface of the holder part faces upward, pouring an unhardened adhesive agent via the liquid-pouring grooves of the inner circumferential surfaces of the holder part between the departing portions and departing-portion opposing portions of the outer circumferential surfaces of the cylindrical batteries, the departing-portion opposing portions opposing the departing portions, and allowing the unhardened adhesive agent to spread between the departing portions and the departing-portion opposing portion of the cylindrical batteries around the whole circumferences of the cylindrical batteries so as to combine the departing portions and the departing-portion opposing portions with each other around the whole circumferences of the cylindrical batteries with the unhardened adhesive agent; and hardening the unhardened adhesive agent so as to form a plurality of adhesive bodies between the inner circumferential surfaces of the holder part and the outer circumferential surfaces of the cylindrical batteries, wherein each of the liquid-pouring grooves is a partial circumference part, of a respective one of the battery through-holes, that connects the second surface and a respective one of the departing portions to each other, and that is recessed in a radially outward direction such that the liquid- pouring groove is further from a center axis of the respective one of the battery through-holes than a circumference part of the respective one of the battery through-holes that opposes the liquid-pouring groove and is connected to the second surface.

7. The manufacturing method for the assembled battery according to claim 6, wherein the adhesive bodies provide air-tight sealing between the battery through-holes and the cylindrical batteries inserted in the battery through-holes in the plate-thickness direction.

8. The manufacturing method for the assembled battery according to claim 6, wherein each of the inner circumferential surfaces is provided with a single liquid-pouring groove that is one of the liquid-pouring grooves, and pouring the unhardened adhesive agent in accordance with a predetermined procedure several times repetitively, between the outer circumferential surfaces of the cylindrical batteries and the inner circumferential surfaces of the holder part.

9. The manufacturing method for the assembled battery according to claim 6, wherein each posture restricting portion includes a first posture restricting portion disposed closer to the first surface than each departing portion in the plate-thickness direction, and the first posture restricting portion has a smaller diameter than a diameter of the departing portion, and in a state in which the postures of the cylindrical batteries inserted in the inner circumferential surfaces are put in postures within ranges restricted by the first posture restricting portions, the unhardened adhesive agent is poured between the departing portions and the departing-portion opposing portions of the outer circumferential surfaces of the cylindrical batteries, the departing-portion opposing portions opposing the departing portions, and the unhardened adhesive agent is hardened so as to form the adhesive bodies.

10. The manufacturing method for the assembled battery according to claim 9, wherein the posture restricting portions include second posture restricting portions located closer to the second surface than the departing portions in the plate-thickness direction, and diameters of the second posture restricting portions are smaller than diameters of the departing portions.

* * * * *